(12) United States Patent
Shelton et al.

(10) Patent No.: US 11,174,148 B2
(45) Date of Patent: Nov. 16, 2021

(54) DEVICES AND METHODS FOR HEATING FLUID DISPENSERS, HOSES, AND NOZZLES

(71) Applicant: Wayne Fueling Systems LLC, Austin, TX (US)

(72) Inventors: Artemus A. Shelton, Austin, TX (US); Daniel Holmes, Austin, TX (US); Jeffrey Reiter, Austin, TX (US); Randal Scott Kretzler, Austin, TX (US)

(73) Assignee: Wayne Fueling Systems LLC, Austin, TX (US)

(*) Notice: Subject to any disclaimer, the term of this patent is extended or adjusted under 35 U.S.C. 154(b) by 1584 days.

(21) Appl. No.: 14/678,486

(22) Filed: Apr. 3, 2015

(65) Prior Publication Data

US 2015/0298962 A1   Oct. 22, 2015

Related U.S. Application Data

(63) Continuation-in-part of application No. 14/568,729, filed on Dec. 12, 2014, now Pat. No. 9,637,370, (Continued)

(51) Int. Cl.
  *B67D 7/82* (2010.01)
  *B67D 7/02* (2010.01)
  (Continued)

(52) U.S. Cl.
  CPC ............. *B67D 7/82* (2013.01); *B67D 7/02* (2013.01); *B67D 7/04* (2013.01); *B67D 7/3218* (2013.01);
  (Continued)

(58) Field of Classification Search
  CPC .......... B67D 7/02; B67D 7/04; B67D 7/3218; B67D 7/42; B67D 7/425; B67D 7/82;
  (Continued)

(56) References Cited

U.S. PATENT DOCUMENTS

| 1,252,614 A | 1/1918 | Pieper et al. |
| 1,809,714 A | 6/1931 | Carl |

(Continued)

FOREIGN PATENT DOCUMENTS

| CN | 201024081 Y | 2/2008 |
| CN | 202132648 U | 2/2012 |

(Continued)

OTHER PUBLICATIONS

U.S. Appl. No. 13/743,151, 30 pages, filed Jan. 16, 2013.

(Continued)

*Primary Examiner* — Tu B Hoang
*Assistant Examiner* — Diallo I Duniver
(74) *Attorney, Agent, or Firm* — Mintz Levin Cohn Ferris Glovsky and Popeo, P.C.

(57) ABSTRACT

Various exemplary devices and methods for heating fluid dispensers, hoses, and nozzles are provided. In general, the devices and methods for heating fluid dispensers, hoses, and nozzles can be configured to heat fluid dispensable by a user into a fuel tank or other type of container. In some embodiments, a fuel dispensing device can include a first passageway configured to pass fluid therethrough and can include a second passageway fluidically isolated from the first passageway and having a heating element disposed therein. The heating element can be configured to heat the fluid passing through the first passageway. The first and second passageways can extend through at least a distal portion of a hose of the fluid dispensing device and through at least a proximal portion of a nozzle of the fluid dispensing device that has a proximal end attached to a distal end of the hose.

16 Claims, 32 Drawing Sheets

Related U.S. Application Data which is a continuation-in-part of application No. 14/286,405, filed on May 23, 2014.

(60) Provisional application No. 62/078,220, filed on Nov. 11, 2014, provisional application No. 61/981,577, filed on Apr. 18, 2014.

(51) Int. Cl.
| | | |
|---|---|---|
| *B67D 7/42* | (2010.01) | |
| *F16L 53/32* | (2018.01) | |
| *B67D 7/04* | (2010.01) | |
| *H05B 3/58* | (2006.01) | |
| *F16L 53/38* | (2018.01) | |
| *B67D 7/32* | (2010.01) | |

(52) U.S. Cl.
CPC ............... *B67D 7/42* (2013.01); *B67D 7/425* (2013.01); *F16L 53/32* (2018.01); *H05B 3/58* (2013.01); *F16L 53/38* (2018.01)

(58) Field of Classification Search
CPC ........ B67D 7/0238; B67D 7/645; B67D 7/78; B67D 7/54; B67D 7/0288; F16L 53/32; F16L 53/38; F16L 11/085; F16L 11/127; H05B 3/58; B05B 7/1693; B05B 7/26; B32B 15/02; B32B 15/043; B32B 15/082; B32B 15/095; B32B 1/08; B32B 2255/06; B32B 2307/302; B32B 27/40; B32B 2597/00; B32B 27/06; B32B 27/32; B32B 27/34; Y10T 428/13; Y10T 428/12542; Y10T 428/12569; Y10T 428/12715; Y10T 428/12778
USPC ........... 141/82, 70, 59; 138/32–33; 137/341, 137/561 R; 392/465–496, 466; 438/34.1, 438/622, 626, 647, 656; 219/301, 535
See application file for complete search history.

(56) References Cited

U.S. PATENT DOCUMENTS

| | | | |
|---|---|---|---|
| 2,526,405 A | 10/1950 | Peeps | |
| 2,801,323 A | 7/1957 | Andrew | |
| 3,378,673 A * | 4/1968 | Hopper | F16L 53/38 |
| | | | 392/472 |
| 3,754,118 A * | 8/1973 | Booker | H05B 3/82 |
| | | | 219/523 |
| 3,784,785 A * | 1/1974 | Noland | F24H 1/142 |
| | | | 392/468 |
| 3,832,525 A | 8/1974 | Stanton et al. | |
| 3,932,727 A * | 1/1976 | True | F16L 59/024 |
| | | | 392/468 |
| 3,968,346 A * | 7/1976 | Cooksley | F24H 1/102 |
| | | | 392/491 |
| 4,372,279 A | 2/1983 | Parks | |
| 4,447,706 A * | 5/1984 | Eder | F23D 11/44 |
| | | | 123/549 |
| 4,808,793 A | 2/1989 | Hurko | |
| 4,883,943 A * | 11/1989 | Davis | F02M 31/125 |
| | | | 392/486 |
| 4,926,028 A | 5/1990 | Fortune | |
| 5,195,564 A | 3/1993 | Spalding | |
| 5,285,826 A | 2/1994 | Sanders et al. | |
| 5,351,727 A | 10/1994 | Sanders et al. | |
| 5,355,915 A | 10/1994 | Payne | |
| 5,542,458 A | 8/1996 | Payne et al. | |
| 5,600,752 A * | 2/1997 | Lopatinsky | A61M 16/1075 |
| | | | 138/114 |
| 5,807,332 A * | 9/1998 | Augustine | A61M 5/44 |
| | | | 165/163 |
| 5,832,178 A * | 11/1998 | Schave | B05C 11/1042 |
| | | | 392/472 |
| 5,859,953 A | 1/1999 | Nickless | |
| 5,868,175 A | 2/1999 | Duff et al. | |
| 5,933,574 A * | 8/1999 | Avansino | F16L 53/38 |
| | | | 392/468 |
| 5,992,395 A | 11/1999 | Hartsell, Jr. et al. | |
| 6,109,826 A * | 8/2000 | Mertes | E01C 19/45 |
| | | | 392/472 |
| 6,135,359 A * | 10/2000 | Almasy | E03B 7/10 |
| | | | 137/341 |
| 6,357,493 B1 | 3/2002 | Shermer et al. | |
| 6,427,717 B1 | 8/2002 | Kimura | |
| 6,499,516 B2 | 12/2002 | Pope et al. | |
| 6,710,302 B1 | 3/2004 | Rennick | |
| 6,810,922 B1 | 11/2004 | Grantham | |
| 6,835,223 B2 * | 12/2004 | Walker | B01D 53/22 |
| | | | 141/44 |
| 6,899,149 B1 | 5/2005 | Hartsell, Jr. et al. | |
| 6,915,638 B2 | 7/2005 | Runkle et al. | |
| 6,923,221 B2 | 8/2005 | Riffle | |
| 6,953,354 B2 * | 10/2005 | Edirisuriya | A61M 16/16 |
| | | | 439/191 |
| 7,991,273 B2 * | 8/2011 | Sonderegger | F16L 53/38 |
| | | | 392/478 |
| 8,455,800 B2 | 6/2013 | Tix et al. | |
| 8,604,392 B1 * | 12/2013 | Ostrom | H05B 3/58 |
| | | | 219/214 |
| 9,637,370 B2 | 5/2017 | Shelton et al. | |
| 10,287,156 B2 | 5/2019 | Shelton et al. | |
| 10,597,285 B2 | 3/2020 | Shelton et al. | |
| 2005/0274713 A1 * | 12/2005 | Malone | F16L 53/38 |
| | | | 219/535 |
| 2007/0079982 A1 * | 4/2007 | Laurent | A61M 16/08 |
| | | | 174/68.1 |
| 2007/0212037 A1 * | 9/2007 | Koenekamp | F16L 11/121 |
| | | | 392/468 |
| 2008/0271801 A1 | 11/2008 | Sonderegger et al. | |
| 2011/0272063 A1 | 11/2011 | Tumarkin | |
| 2012/0024892 A1 | 2/2012 | Bartlett et al. | |
| 2012/0100735 A1 * | 4/2012 | Rosenfeldt | F16L 53/38 |
| | | | 439/190 |
| 2012/0234421 A1 * | 9/2012 | Powell | F16L 25/01 |
| | | | 138/33 |
| 2012/0305089 A1 * | 12/2012 | Larsson | F16L 53/008 |
| | | | 137/1 |
| 2013/0125989 A1 | 5/2013 | Clever et al. | |
| 2014/0261762 A1 | 9/2014 | Barendregt et al. | |
| 2015/0298961 A1 | 10/2015 | Shelton et al. | |
| 2015/0300550 A1 | 10/2015 | Shelton et al. | |
| 2016/0280532 A1 | 9/2016 | McClelland | |

FOREIGN PATENT DOCUMENTS

| | | | |
|---|---|---|---|
| CN | 202139039 U | 2/2012 | |
| DE | 202005010318 U1 | 9/2005 | |
| DE | 202013006358 U1 | 7/2013 | |
| DE | 202014000767 U1 | 2/2014 | |
| EP | 2075218 A1 | 7/2009 | |
| WO | WO-2011/054400 A1 | 5/2011 | |
| WO | WO-2012010245 A1 | 1/2012 | |
| WO | WO-2012076217 A1 * | 6/2012 | ........... F01N 3/2066 |
| WO | WO-2012/103437 A2 | 8/2012 | |
| WO | WO-2015/063387 A1 | 5/2015 | |

OTHER PUBLICATIONS

Partial International Search Report for PCT/US2015/025583 dated Jul. 23, 2015.
U.S. Appl. No. 16/822,918, filed Mar. 18, 2020, Artemus A. Shelton et al.

* cited by examiner

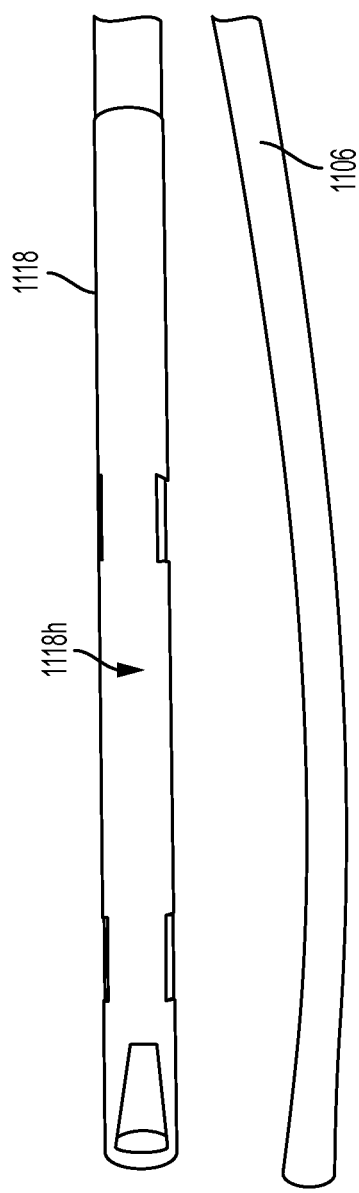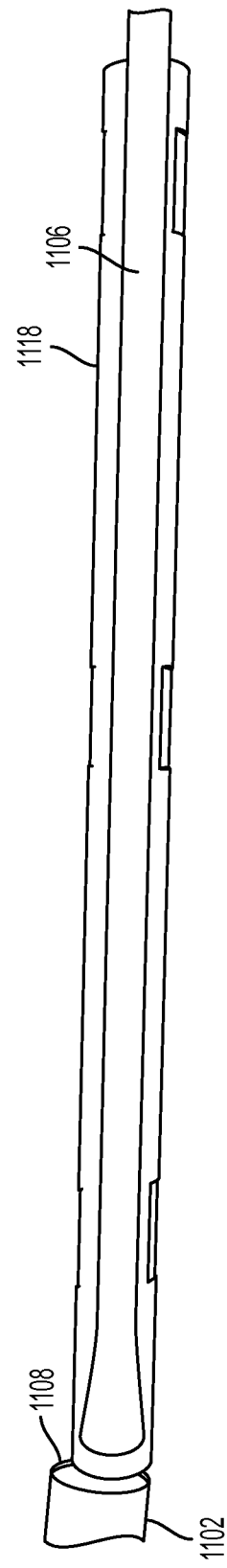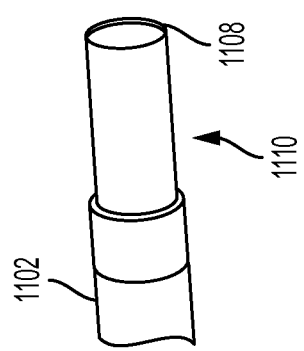
FIG. 37
FIG. 38
FIG. 39

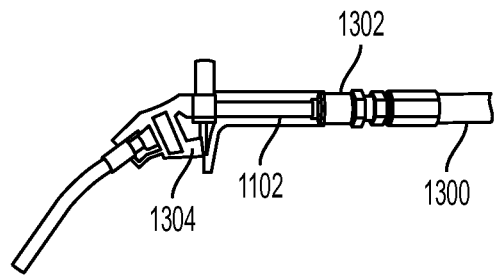
FIG. 46
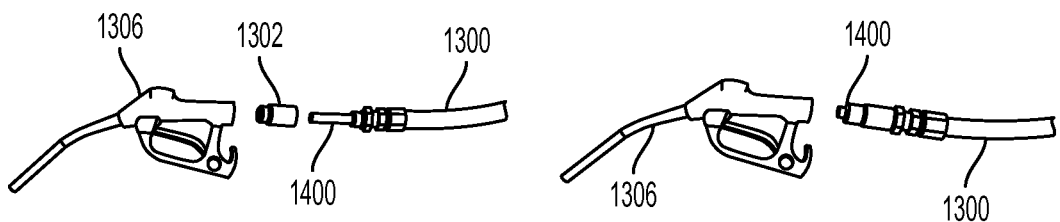
FIG. 47  FIG. 48
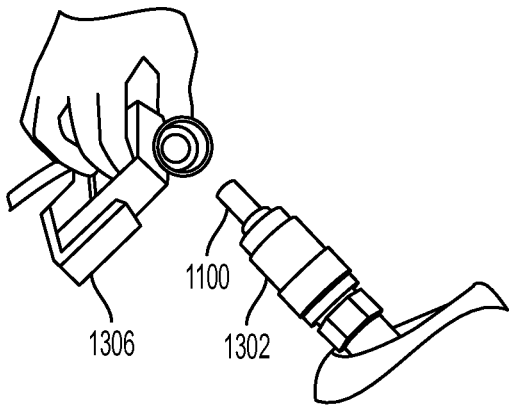 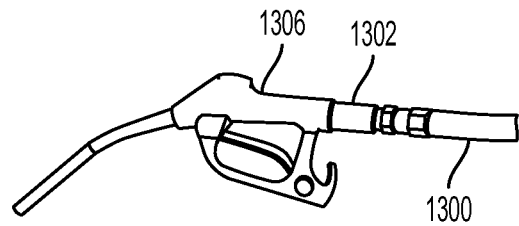
FIG. 49  FIG. 50
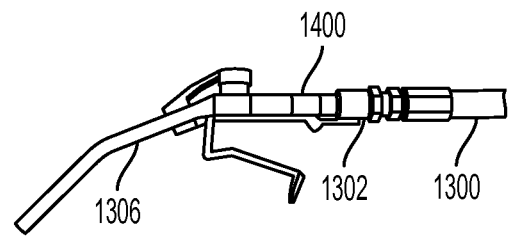
FIG. 51

DEVICES AND METHODS FOR HEATING
FLUID DISPENSERS, HOSES, AND NOZZLES

CROSS REFERENCE

The present application is a continuation-in-part of U.S. application Ser. No. 14/568,729 entitled "Devices And Methods For Heating Fluid Dispensers, Hoses, And Nozzles" filed Dec. 12, 2014, which claims priority to U.S. Provisional Application No. 62/078,220 entitled "A Fluid Dispensing Unit Having A Heating System" filed Nov. 11, 2014 and which is a continuation-in-part of U.S. application Ser. No. 14/286,405 entitled "Devices And Methods For Heating Fuel Hoses And Nozzles" filed May 23, 2014, which claims priority to U.S. Provisional Application No. 61/981,577 entitled "Devices And Methods For Heating Fuel Hoses And Nozzles" filed Apr. 18, 2014, which are hereby incorporated by reference in their entireties.

FIELD

The subject matter disclosed herein relates to devices and methods for heating fluid dispensers, hoses, and nozzles.

A typical fueling environment includes one or more fuel dispensers which can be used by a customer to dispense fuel into a vehicle, a portable fuel tank, or other equipment. Fuel dispensers are often located outside where they are exposed to weather, which can include exposure to low temperatures. The low temperatures can in some instances be below the freezing temperature of fluid being dispensed therefrom, which can cause the fluid to freeze. The fluid therefore cannot be dispensed in response to user demand and/or the fuel dispenser can be damaged by the frozen fluid. Even if the low temperatures are not sufficiently low so as to cause the fluid to entirely freeze, the temperatures can be low enough to cause the fluid to begin a transition to being frozen, which can cause the fluid dispenser to become clogged with ice crystals, slush, etc.

Heated cabinets for fuel dispensers have been developed to help prevent fluid from freezing outdoors. However, the heated cabinets can be aesthetically unpleasing, can be cumbersome by being large and/or unwieldy, and/or can provide inefficient heating. Another approach that has been developed to help prevent fluid from freezing outdoors has been to contain a hose and/or nozzle of the fuel dispenser within a shroud. However, the shroud can be aesthetically unpleasing, can be cumbersome by getting in the way of a user's handling of the fuel dispenser, and/or can provide inefficient heating.

Accordingly, there remains a need for devices and methods for heating fluid dispensers, hoses, and nozzles.

BRIEF DESCRIPTION

Devices and methods for heating fluid dispensers, hoses, and nozzles are generally disclosed herein.

In one embodiment, a heating assembly for use with a fuel dispenser hose and nozzle is provided that includes a conductive outer extension tube, an flexible outer tube, a conductive inner extension tube, and a heating element. The conductive outer extension tube can include a first end with a well formed therein. The well can extend at least partially through the conductive outer extension. The flexible outer tube can have a longitudinal passageway extending therethrough. A first end of the flexible outer tube can be coupled to the first end of the conductive outer extension tube. The conductive inner extension tube can extend through the conductive outer extension tube and can have a first end mated to the first end of the conductive outer extension tube. The heating element can extend longitudinally through the longitudinal passageway of the flexible outer tube and can extend at least partially through the longitudinal passageway in the conductive inner extension tube. The heating element can be configured to heat fluid surrounding the conductive outer extension tube.

In another aspect, a fluid dispensing device is provided that in one embodiment includes a hose, a heating element, and a nozzle. The hose can have first and second passageways extending longitudinally therein. The first passageway can be configured to pass fluid therethrough. The second passageway can be independent from the first passageway. The heating element can extend longitudinally within the second passageway. The heating element can be configured to heat fluid within the first passageway. The nozzle can be attached to a distal end of the hose. The first passageway can extend therein such that fluid is allowed to exit a distal opening of the first passageway to be dispensed from the nozzle.

In another aspect, a fuel dispensing device is provided that in one embodiment includes a housing, a hose, a nozzle, a tube, and a heating element. The housing can have fuel dispensing components therein. The hose can be coupled to the housing and can be in fluid communication with the fuel dispensing components such that fluid can be passed from the fuel dispensing components through an inner lumen of the hose. The nozzle can be attached to a distal end of the hose and can be configured to receive fluid from the hose and to dispense fluid therefrom. The tube can extend longitudinally within the hose and can have an inner lumen extending therethrough. The inner lumen of the tube can be isolated from the inner lumen of the hose. The heating element can extend longitudinally within the inner lumen of the tube. The heating element can be configured to heat fluid passing through the hose.

In another embodiment, a fuel dispensing device is provided that includes a hose, a heat element, and a nozzle. The hose can have first and second passageways extending longitudinally therethrough. The first passageway can be configured to pass fluid therethrough, the second passageway can be adjacent to and independent from the first passageway, and the second passageway can be configured to pass air therethrough. The heat element can be in communication with the second passageway and can be configured to heat the air passing through the second passageway, thereby heating the fluid within the first passageway that is adjacent the second passageway. The nozzle can be attached to a distal end of the hose. The first passageway can extend therethrough such that the fluid is allowed to exit a distal opening of the first passageway to be dispensed from the nozzle, the second passageway can have a distal opening that is proximal to the distal opening of the first passageway, and the distal opening of the second passageway can allow the air to pass therethrough.

In another embodiment, a fuel dispensing device can include a hose, a nozzle, and a manifold. The hose can have first and second passageways extending therethrough. The first passageway can be configured to pass fluid therethrough, and the second passageway can be configured to pass heated air therethrough. The nozzle can be attached to the hose, can have the first and second passageways extending therethrough, can be configured to dispense the fluid from the first passageway, and can be configured to release the heated air. The manifold can have a first opening configured to communicate with the first and second passageways, can have a second opening in fluid communication with the first opening and configured to communicate with a fluid supply that supplies the fluid to the first passageway, and can have a third opening in fluid communication with the first opening and configured to communicate with an air supply that supplies the air to the second passageway. The manifold can be configured to prevent the fluid passing through the first and second openings from mixing with the air passing through the first and third openings.

In another embodiment, a fuel dispensing device includes a hose configured to pass fluid therethrough, a nozzle attached to a distal end of the hose, a housing, a heat element, a sensor, and a controller. The nozzle can be configured to receive the fluid from the hose, can be configured to dispense the fluid from a distal end thereof, and can be configured to pass air therethrough such that air is allowed to pass through an opening of the nozzle. The fluid and the air can be prevented from mixing together within the nozzle. The housing can have a cavity configured to releasably seat the nozzle therein. The heat element can be configured to heat the air passing through the nozzle. The sensor can be configured to sense a temperature. The controller can be configured to allow the heat element to provide heat therefrom when the sensed temperature is above a predetermined threshold temperature, and the controller can be configured to prevent the heat element from providing heat when the sensed temperature is below the predetermined threshold temperature.

In another embodiment, a fuel dispensing device includes a hose, a nozzle, a heat element, a sensor, and a controller. The hose can have a first passageway extending longitudinally therethrough. The first passageway can be configured to pass fluid therethrough. The nozzle can be attached to a distal end of the hose. The first passageway can extend therethrough such that the fluid is allowed to be dispensed from the nozzle. The nozzle can include a second passageway extending therethrough and being configured to pass air therethrough such that air is allowed to pass through an opening of the nozzle. The second passageway can be adjacent to and independent from the first passageway. The heat element can be configured to heat the air passing through the second passageway. The sensor can be configured to sense a temperature adjacent the opening of the nozzle. The controller can be configured to allow the heat element to provide heat therefrom when the sensed temperature is above a predetermined threshold temperature, and the controller can be configured to prevent the heat element from providing heat when the sensed temperature is below the predetermined threshold temperature.

In another embodiment, a fuel dispensing device includes a housing configured to be coupled to a fuel supply, a nozzle boot coupled to the housing, a heating element disposed at least partially within the housing and configured to heat air, and a tubular member having an inner lumen extending therethrough. The nozzle boot can be configured to removably and replaceably seat a fuel-dispensing nozzle therein. An air exit opening of the inner lumen can be located adjacent to the nozzle boot. The fuel dispensing device also includes a flow mechanism configured to urge the air heated by the heating element to flow through the inner lumen of the tubular member so as to direct the air heated by the heating element out of the air exit opening and into the nozzle boot.

In another embodiment, a fuel dispensing device includes a housing, a nozzle boot positioned on the housing and configured to releasably and replaceably seat a fuel-dispensing nozzle, a heating element disposed at least partially within the housing, and a first conduit extending through the housing to the nozzle boot. The first conduit can be configured to pass air heated by the heating element from the housing through an inner lumen of the first conduit and into the nozzle boot. The fuel dispensing device also includes a flow mechanism configured to urge the air heated by the heating element to flow through the inner lumen.

In another aspect, a fuel dispensing method is provided that in one embodiment includes allowing passage of fluid through a first passageway of a fuel dispensing system and out of the fuel dispensing system through a nozzle of the fuel dispensing system, and forcing heated air through a second passageway of the fuel dispensing system. The second passageway can be disposed within the first passageway, a sidewall defining the second passageway can prevent the heated air within the second passageway from mixing with the fluid within the first passageway, the heated air can heat the fluid within the first passageway, and the heated air can pass through the fuel dispensing system through the nozzle.

In another embodiment, a fuel dispensing system can include allowing passage of fluid through a first passageway of a fuel dispensing system and out of the fluid dispensing system through a nozzle of the fuel dispensing system, and forcing heated air through a second passageway of the fuel dispensing system. The second passageway can be adjacent to the first passageway such that the heated air within the second passageway heats the fluid within the first passageway. The first passageway can be separate from the second passageway so as to prevent the heated air within the second passageway from mixing with the fluid within the first passageway. The method can also include allowing the heated air to exit the second passageway into a cavity of the fuel dispensing system, sensing a temperature, and heating the air when the sensed temperature is above a predetermined threshold temperature and not heating the air when the temperature is below the predetermined threshold temperature.

In another aspect, a fluid dispensing device is provided that in one embodiment includes a hose configured to pass fluid therethrough, a nozzle attached to a distal end of the hose, a nozzle boot configured to removably and replaceably seat the nozzle, and a heating element configured to heat air directed into the nozzle boot so as to allow the heated air to heat the nozzle when the nozzle is seated in the nozzle boot. The hose can have first and second coaxial passageways extending therethrough. The first and second coaxial passageways can be configured to facilitate heating of the fluid flowing through the hose. The nozzle can be configured to dispense the fluid therefrom.

In another aspect, a fluid dispensing unit is provided that in one embodiment includes a fluid hose configured to pass fluid therethrough, a nozzle connected to a distal end of the fluid hose and configured to dispense fluid from the fluid dispensing unit to a vehicle, a heating element, a fan in communication with the heating element and driven by a motor, and a first conduit configured to pass air heated by the heating element therethrough by means of the fan. The first conduit has a distal opening which is proximal to the nozzle in order to direct the heated air thereto.

BRIEF DESCRIPTION OF THE DRAWING

These and other features will be more readily understood from the following detailed description taken in conjunction with the accompanying drawings, in which:

FIG. 37 is a partial exploded perspective view of the heating assembly of FIG. 33 including the heating element, the outer extension tube, and a heat transfer element;

FIG. 38 is partially assembled perspective view of the heating element, the outer extension tube, and the heat transfer element of FIG. 37;

FIG. 39 is an expanded perspective view of the heating element, the outer extension tube, and the heat transfer element of FIG. 38;

FIG. 46 is a side cross-sectional view of the heating assembly, the swivel, and the hose, and the nozzle of FIG. 45;

FIG. 47 is an exploded side view of the hose of FIG. 41, the swivel of FIG. 42, and embodiments of a nozzle and a heating assembly;

FIG. 48 is a side partially assembled view of the heating assembly, the swivel, and the hose of FIG. 47 assembled together and the nozzle of FIG. 47 unattached therefrom;

FIG. 49 is a perspective view of the partial assembly of FIG. 48;

FIG. 50 is a side view of the heating assembly, the swivel, and the hose, and the nozzle of FIG. 49 assembled together;

FIG. 51 is a side cross-sectional view of the heating assembly, the swivel, and the hose, and the nozzle of FIG. 50;

Figure 1:
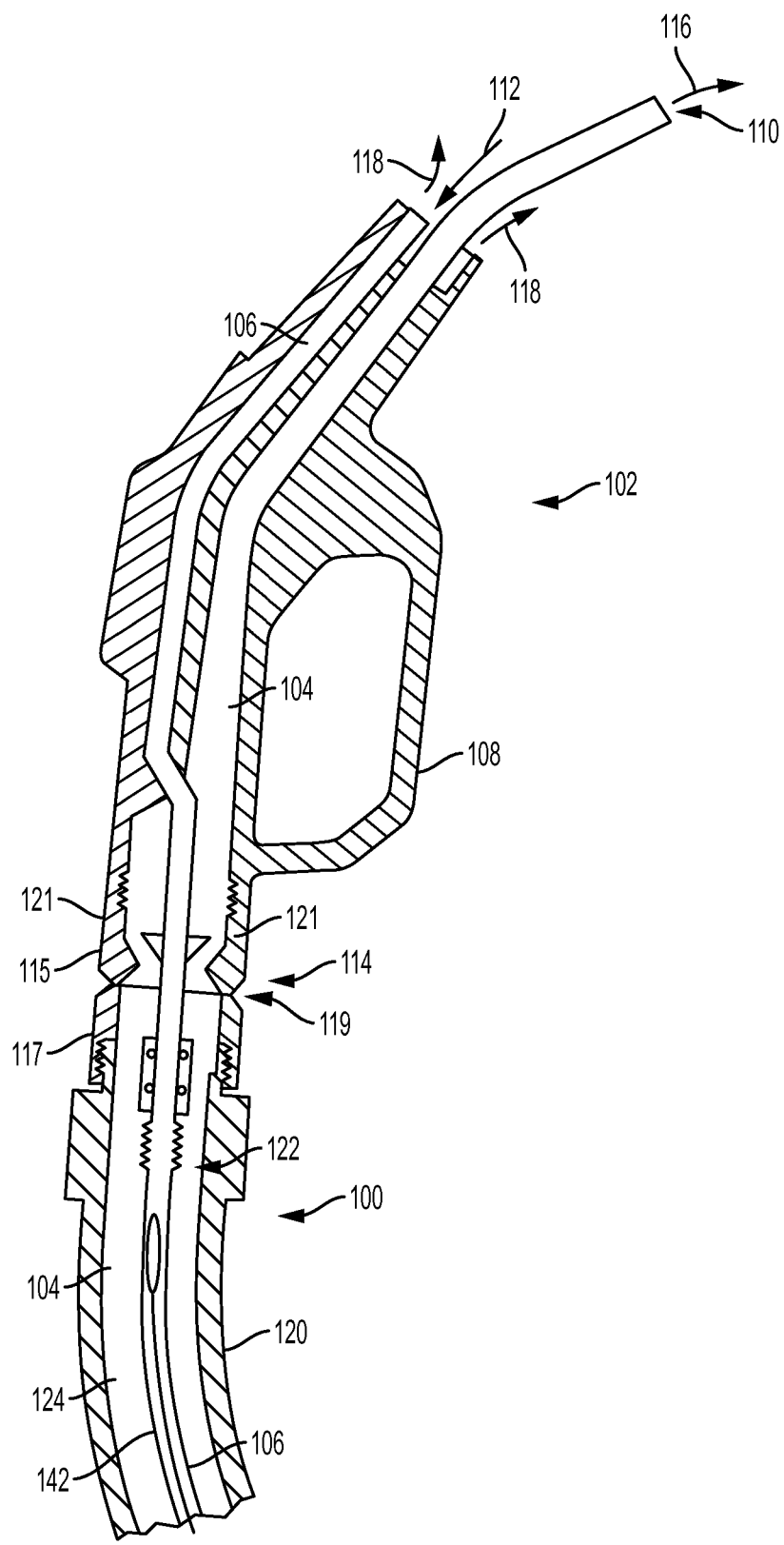
FIG. 1 is a side cross-sectional view of one embodiment of a hose and a nozzle of a fuel dispensing device.

It is noted that the drawings are not necessarily to scale. The drawings are intended to depict only typical aspects of the subject matter disclosed herein, and therefore should not be considered as limiting the scope of the disclosure. In the drawings, like numbering represents like elements between the drawings.

DETAILED DESCRIPTION

Certain exemplary embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting exemplary embodiments and that the scope of the present invention is defined solely by the claims. In the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. The features illustrated or described in connection with one exemplary embodiment may be combined with the features of other embodiments. Such modifications and variations are intended to be included within the scope of the present invention.

Various exemplary devices and methods for heating fluid dispensers, hoses, and nozzles are provided. The devices and methods disclosed herein produce a number of advantages and/or technical effects.

In general, the devices and methods for heating fluid dispensers, hoses, and nozzles can be configured to heat fluid dispensable by a user into a fuel tank or other type of container, thereby helping to prevent the fluid from freezing if the fluid is in an environment having a temperature below the fluid's freezing point. In some embodiments, a fluid dispensing device can include a first passageway configured to pass fluid therethrough and can include a second passageway fluidically isolated from the first passageway and having a heating element disposed therein. The heating element can be configured to heat the fluid passing through the first passageway. The first and second passageways can extend through at least a distal portion of a hose of the fluid dispensing device and through at least a proximal portion of a nozzle of the fluid dispensing device that has a proximal end attached to a distal end of the hose. The heating element can thus be configured to heat fluid in the first passageway in the hose and in the nozzle, which can help prevent the fluid from freezing within either of the hose or the nozzle. The fluid can be configured to be heated from within the hose and the nozzle, which can allow the fluid to be heated without any external heating components being visible to the user dispensing the fluid, thereby allowing for a more visually appealing fuel dispenser and/or allowing the fluid to be heated without heating-related components being physically in the user's way when the user is dispensing the fluid so as to make using the dispenser cumbersome and/or require user movement of a shroud before dispensing fluid. Because the heat source that heats the fluid can be very close to the fluid, as opposed to various traditional heating techniques such as heated cabinets, lower wattage can be used to heat the fluid, thereby reducing adverse effects of thermodynamic loss, improving efficiency, saving energy, and/or reducing monetary cost.

In some embodiments, a fuel dispensing device can include a first passageway configured to pass fluid therethrough and can include a second passageway configured to pass heated air therethrough. The heated air passing through the second passageway can be configured to heat the fluid passing through the first passageway. The first and second passageways can be independent from one another such that the air does not mix with the fluid and, hence, does not dilute or otherwise affect the integrity of the fluid. The first and second passageways can be coaxial with one another with the second passageway being disposed within the first passageway, e.g., a tube passing the heated air being disposed within a tube passing the fluid. The first and second passageways can extend through a hose and a nozzle of the fuel dispenser, which can help prevent the fluid from freezing within either of the hose or the nozzle. Similar to that discussed above, the fluid can be configured to be heated from within the hose and the nozzle, and the heat source that heats the fluid can be very close to the fluid. The air can enter the hose in an unheated state or in a heated state. If the air enters the hose in an unheated state, the fuel dispenser can be configured to heat the air after the air enters the hose, such as with a heating element disposed at least partially within the hose.

In some embodiments, a fuel dispensing device can include a single hose configured to pass fluid and heated air through separate passageways therein, and the device can include a manifold configured to facilitate passage of the fluid and the heated air from separate sources into the single hose. The manifold can include first, second, and third coupling elements. The first coupling element can be configured to attach to a proximal end of the hose. A distal end of the hose can be configured to attach to a nozzle configured to dispense the fluid therefrom. The second coupling element can be in fluid communication with the first coupling element, and can be configured to couple to a fluid source (e.g., a reservoir, a tank, etc.) that supplies the fluid. The third coupling element can be in fluid communication with the first coupling element without being in fluid communication with the second coupling element, and can be configured to couple to an air supply (e.g., an air pump, an air compressor, etc.) that supplies the air. The manifold can thus be configured to allow the fluid and the air to simultaneously flow through the single hose while allowing the fluid to be heated without the air heating the fluid mixing with the fluid. The air supply can be configured to supply the air in an unheated state or in a heated state. If the air supply supplies the air in an unheated state, the fuel dispenser can be configured to heat the air after being supplied thereto, such as with a heating element.

In some embodiments, a fuel dispensing device can be configured to heat a nozzle of the fuel dispensing device when the nozzle is in an idle position, e.g., is seated in a nozzle boot of the fuel dispensing device. The nozzle is a component which is especially exposed to cold and which is hard to heat in an efficient manner since it is located on an outer portion of the fluid dispensing device. The methods and devices provided herein can help heat the exposed nozzle in an efficient manner. Fuel can thus be properly dispensed on demand from the nozzle even if the nozzle has been sitting idle in a cold temperature for any length of time since the nozzle can be heated while idle. The fuel dispensing device can be configured to heat the nozzle in an idle position using independent first and second passageways in a hose of the device and/or the nozzle of the device, such as the first and second coaxial passageways mentioned above. Alternatively or in addition, the fuel dispensing device can be configured to heat the nozzle in an idle position using a conduit disposed within a housing of the fuel dispensing device, e.g., within a cabinet of the fuel dispensing device that contains various components of the device therein, and having a heated fluid exit opening directed toward a nozzle boot of the fuel dispensing device configured to seat the nozzle therein. The fuel dispensing device can include a mechanism such as a fan or a pump configured to direct the heated fluid through the conduit toward the nozzle boot. This mechanism can also be configured to direct heated fluid through at least one additional conduit disposed within the housing of the fuel dispensing device and configured to heat the housing, e.g., heat an interior of the housing. The housing can thus be efficiently heated and can help prevent the freezing and/or crystallization of fuel dispensed by the fuel dispensing device. The at least one additional conduit can have a heated fluid exit opening directed toward a bottom of the housing's interior, thereby allowing the heated fluid exiting from the opening to rise upwards within the housing's interior to facilitate heating of the entire interior. In some embodiments, the fuel dispensing device can be configured to heat the housing without directing heated fluid through a conduit toward the nozzle boot. This can help reduce manufacturing costs of the fuel dispensing device and/or can help reduce a number of components disposed within a top portion of the housing (e.g., within an electronics component of the housing) so as to facilitate repair and/or replacement of the top portion of the housing and/or components contained in the top portion of the housing.

The fuel dispensing devices described herein can be configured to dispense any kind of fluid, as will be appreciated by a person skilled in the art. In some embodiments, the fluid can include a fuel of any type of ammonia/water blend usable in automobiles. In an exemplary embodiment, the fuel dispensing devices described herein can be configured to dispense diesel exhaust fluid (DEF), e.g., AdBlue®. In Europe AUS32 is generally sold under the trade mark of AdBlue®, and in North America the trade name for AUS32 is diesel exhaust fluid or DEF. Accordingly, the terms AUS32, AdBlue®, and DEF used herein refer to the same material. DEF has a freezing temperature of 12° F. (−11° C.) and will begin to crystallize at 19° F. (−7° C.), which can make heating of DEF using the devices and methods described herein desirable in geographic areas with colder climates that may have temperatures near or below 19° F. at any point during the year.

AUS32 can be helpful in reducing harmful $NO_x$ emissions. One technique used to reduce the amount of harmful $NO_x$ emissions is selective catalytic reduction (SCR). The basic idea of SCR is to convert $NO_x$ into harmless diatomic nitrogen ($N_2$) and water ($H_2O$). The reaction is enabled using a reductant which is added onto a catalyst. Several reductants may be used such as anhydrous ammonia, aqueous ammonia, or urea. A standard is established for using a SCR reductant in diesel powered vehicles. The reductant used is an aqueous urea solution having a urea concentration of 32.5%. In order to obtain the correct concentration the urea is mixed with demineralized water. When the diesel engine is running AUS32 can be added into the exhaust flow, before or in the catalytic converter, by an amount corresponding to 3-5% of the diesel consumption. When AUS32 is added to the exhaust flow of a diesel engine, the engine can be operated more intensely without generating more $NO_x$ emissions. The devices and methods described herein can thus be desirable to use in fluid dispensing systems that involve the dispensing of diesel fuel.

FIG. 1 illustrates an embodiment of a fuel dispensing device configured to heat fluid 104 that can be dispensed therefrom. The device can include a hose 100 and a nozzle 102. The fuel dispensing device can also include a movable element 114, also referred to herein as a "swivel," disposed between the hose 100 and the nozzle 102 that can be configured to allow the nozzle 102 to be selectively oriented relative to the hose 100. In general, the hose 100 and the nozzle 102 can each be configured to have the fluid 104 pass therethrough and to have a gas, e.g., air 106, pass therethrough. The air 106 can be configured to heat the fluid 104 non-invasively such that the air 106 does not mix with the fluid 104 within the hose 100 or within the nozzle 102. The nozzle 102 can be configured to release the fluid 104 and the air 106 therefrom. The nozzle 102 can be configured to selectively release the fluid 104 therefrom through a fluid exit opening 110, e.g., in response to user manipulation of a dispensing trigger 108 of the nozzle 102, as generally indicated by a fluid exit arrow 116. The nozzle 102 can be configured to automatically pass the air 106 therethrough by releasing the fluid 104 therefrom through an air exit opening 112, as generally indicated by air exit arrows 118. The fuel dispensing device can thus dispense the fluid 104 on demand in accordance with a user's typical expectations of fluid dispensing, e.g., at a gas station, while also providing for heating of the fluid 104 so as to reduce chances of the fluid 104 freezing within the hose 100 and/or within the nozzle 102.

The hose 100 can be configured as a coaxial hose and include a plurality of coaxial tubes. In this illustrated embodiment, the hose 100 includes an outer tube 120 and an inner tube 124 coaxial with and disposed within the outer tube 120. For example, another embodiment of a hose (not shown) can include two tubes similar to the outer and inner tubes 120, 124 and include at least one protective outer tubes therearound.

The outer tube 120 and the inner tube 124 can have a variety of sizes, shapes, and configurations. In an exemplary embodiment, the inner tube 124 can have an inside diameter, e.g., diameter of its interior lumen, that is about two-thirds of its outside diameter. For example, the inner tube 124 can have an outside diameter in a range of about 0.75 in. (19.05 mm) to 0.83 in. (21.0 mm) and an inside diameter of about 0.5 in.

The outer tube 120 can be configured as a protective member to help prevent the fluid 104 and/or the air 106 from escaping from the hose 102. The outer tube 120 can be flexible, which can facilitate user manipulation of the hose 100.

A gap of space 122 can be defined between an inner surface 123 of the outer tube 120 and an outer surface 125 of the inner tube 124. The space 122, also referred to herein as a "fluid cavity" and an "fluid passageway," can be configured to pass the fluid 104 therethrough. The fluid 104 can be configured to be selectively advanced through the space 122 in response to user actuation of the trigger 108, as will be appreciated by a person skilled in the art.

Figure 2:
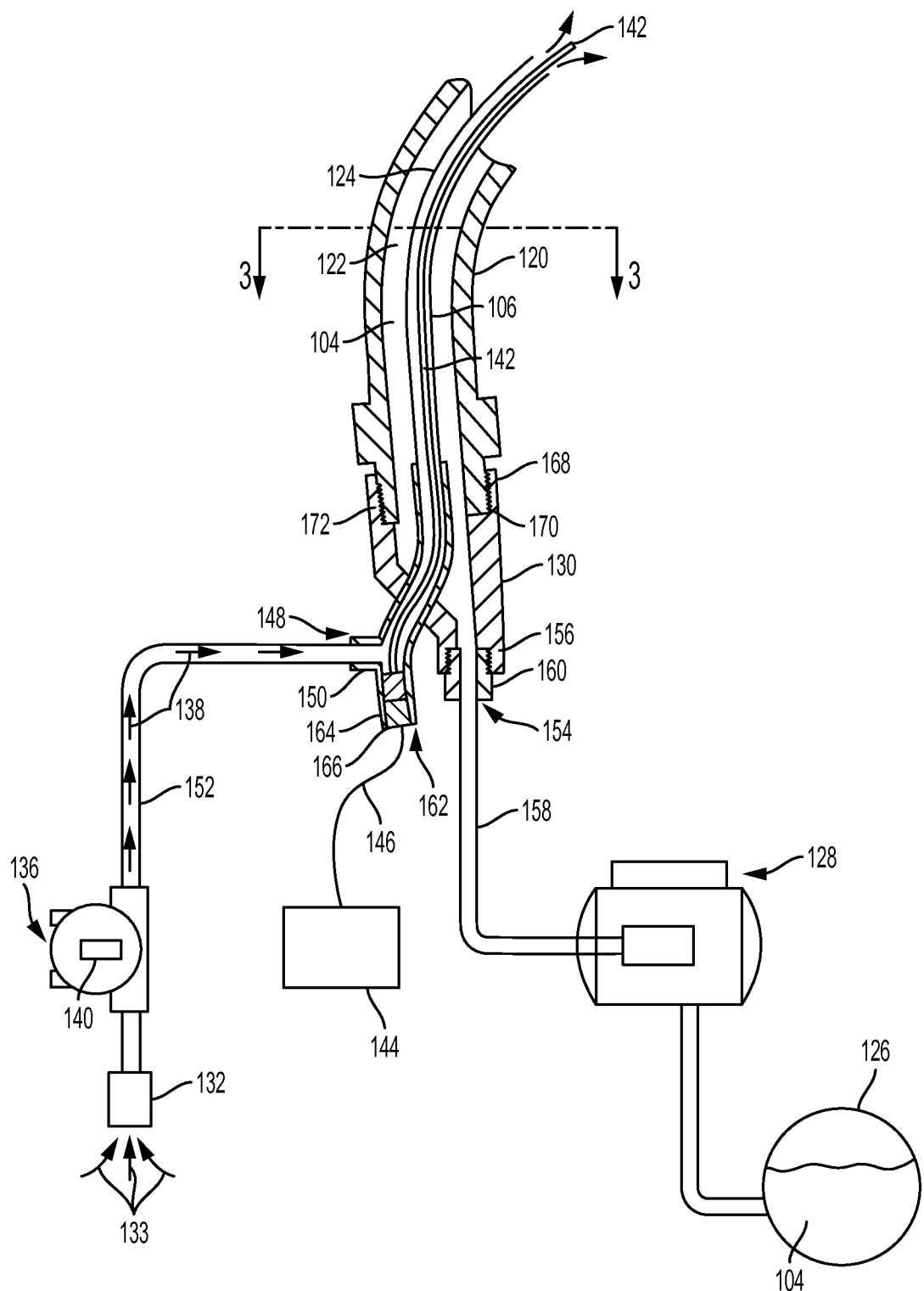
FIG. 2 is a side, partially cross-sectional view of the hose of FIG. 1 attached to a manifold that is attached to a fluid supply, an air supply, and a power supply and control.

The fluid cavity 122 can be configured to be in fluid communication with a fluid supply that stores a supply of fluid to be dispensed using the hose 100 and the nozzle 102. The fluid supply can have a variety of configurations, as will be appreciated by a person skilled in the art. FIG. 2 illustrates an embodiment of a fluid supply 126 that can be in fluid communication with the fluid cavity 122. The fluid supply 126 in this illustrated embodiment is in the form of a reservoir configured to be located underground. The fluid 104 can be configured to be advanced into the fluid passageway 122 from the fluid supply 126 through a fluid meter 128. The fluid meter 128 can be configured to measure an amount of fluid 104 dispensed from the fluid supply 128, as will be appreciated by a person skilled in the art, in order to, e.g., assess proper billing for dispensed fluid. The fluid 104 can also pass through a manifold 130 between the fluid supply 126 and the space 122, as discussed further below. The fluid meter 128 can be coupled to a housing (not shown) of the fuel dispensing device and can be located entirely inside the housing, entirely outside the housing, or partially inside and partially outside the housing. Locating the fluid meter 128 at least partially outside the housing can facilitate repair and/or upgrade of broken or outdated parts without requiring opening of the housing at all and/or opening of the housing in an easier way than if the part being repaired and/or upgraded is entirely within the housing.

The inner tube 124, also referred to herein as an "air tube" and an "air passageway," can be configured to pass the air 106 therethrough. The air 106 can be configured to flow through the air tube 124 without user intervention. In other words, the air 106 can be configured to automatically flow through the air tube 124. The air 106 can thus be configured to automatically heat the fluid 104 in the space 122 surrounding the air tube 124, as discussed further below. The inner tube 124 can be flexible, which can facilitate user manipulation of the hose 100.

The air tube 124 can be configured to be in fluid communication with an air supply that provides air flow through the air tube 124. The air supply can have a variety of configurations, as will be appreciated by a person skilled in the art. The air supply can be coupled to a housing (not shown) of the fuel dispensing device and can be located entirely inside the housing, entirely outside the housing, or partially inside and partially outside the housing. Locating the air supply at least partially outside the housing can facilitate repair and/or upgrade of broken or outdated parts without requiring opening of the housing at all and/or opening of the housing in an easier way than if the part being repaired and/or upgraded is entirely within the housing. FIG. 2 illustrates an embodiment of an air supply that can be in fluid communication with the air tube 124. An intake opening 132 can be configured to allow air to pass therethrough in a direction toward a pump 136. The intake opening 132 can include, for example, a check valve configured to allow passage therethrough in one direction, e.g., toward the hose 100, while preventing passage therethrough in an opposite direction, e.g., away from the hose 100, as shown by air intake directional arrows 134. The intake opening 132 can be configured to allow ambient air to enter therein and/or a dedicated air source can be coupled to the intake valve 132 to provide air thereto.

The air supply can include a pump 136 positioned between the intake valve 132 and the air tube 124. The pump 136 can be configured to force air that enters the intake opening 132 in a direction toward the hose 100, as indicated by air flow directional arrows 138. The pump 136 can thus be configured to direct air flow through the air tube 124, e.g., supply air thereto. In addition to or instead of the pump 136, the air supply can include an air compressor configured to provide compressed or pressurized air to the air tube 124.

The pump 136 can be configured to run continuously so as to continuously force the air 106 through the air tube 124. Continuously running the air 106 through the air tube 124 can help ensure that the fluid 104 within the hose 100 and/or the nozzle 102 does not freeze since heated air can continuously flow adjacent the fluid 104. Alternatively, the pump 136 can be configured to run non-continuously, e.g., intermittently, such that the air 106 is only sometimes forced through the air tube 124. Non-continuously running the air 106 through the air tube 124 can help reduce wear and tear on the pump 136 and/or can help prevent the air 106 from flowing through the air tube 124 when the fluid 104 is not at a temperature at which it may freeze or begin to freeze.

The pump 136 can be configured to not pump the air 106 based on a measured temperature. If the measured temperature is above a predetermined threshold temperature, then the pump 136 can be configured to not pump the air 106 since at such a measured temperature the fluid 104 can be presumed to not be in danger of freezing. If the measured temperature is below the predetermined threshold temperature, then the pump 136 can be configured to pump the air 106 since at such a measured temperature the fluid 104 can be presumed to be in danger of freezing. The predetermined threshold temperature can be based on a freezing point of the fluid 104. In some embodiments, the predetermined threshold temperature can be the fluid's freezing temperature. In other embodiments, the predetermined threshold temperature can be slightly above the fluid's freezing temperature, e.g., 3° above the fluid's freezing temperature, 5° above the fluid's freezing temperature, etc.

In some embodiments, the measured temperature can be a sensed temperature of the fluid 104 in the hose 100 and/or in the nozzle 102. The fluid's temperature in the hose 100 and/or in the nozzle 102 can be sensed using a temperature sensor, as will be appreciated by a person skilled in the art. Using the fluid's temperature as a trigger for the pump's pumping action can help accurately control air flow on an as-needed basis, but positioning a sensor to measure the fluid's temperature can increase a size of the hose 100 and/or the nozzle 102 and/or impede flow of the fluid 104 within the space 122. Any number of sensors can be used to measure fluid temperature.

In some embodiments, the measured temperature can be an ambient temperature outside of the hose 100 and outside of the nozzle 102, e.g., an ambient outdoor temperature. The ambient temperature can be sensed using a temperature sensor, as will be appreciated by a person skilled in the art. Any number of sensors can be used to measure ambient temperature. Using the ambient temperature as a trigger for the pump's pumping action may be less accurate than using the fluid's temperature as a trigger for the pump's pumping action since the fluid 104 can be warmer inside the hose 100 and/or the nozzle 102 than the ambient temperature, but the ambient temperature can nevertheless provide a reliable indication of when it would be prudent to heat the fluid 104 to help avoid freezing of the fluid 104. In an exemplary embodiment, an ambient temperature of 5° C. can be used as the predetermined threshold temperature when the fluid includes DEF. In some embodiments, the ambient temperature can be measured using a sensor positioned at the fluid exit opening 110 of the nozzle 102 where the fluid 104 can be most closely exposed to weather such that using that measured temperature in controlling heating can help ensure that the fluid 104 does not freeze at the fluid exit opening 110 or elsewhere in the nozzle 102 or hose 100. In some embodiments, the ambient temperature can be measured using a sensor attached to a housing (not shown) of the fuel dispensing device, either on an exterior surface thereof where the sensor is directly exposed to weather or within the housing where the sensor is not directly exposed to weather. In some embodiments, the ambient temperature can be measured using a sensor attached to a nozzle boot (not shown) that seats the nozzle 102 when not in use. In some embodiments, ambient temperature sensors can be located in multiple locations, and the lowest measured temperature from any of the sensors can be used to control heating, thereby helping to ensure that fluid 104 is adequately protected from freezing regardless of its location within the hose 100 or the nozzle 102.

In some embodiments, both fluid temperature and ambient temperature can be used to control the pump 136 such that if at least one of a predetermined fluid temperature and a predetermined ambient temperature is exceeded, the pump 136 can begin pumping the air 106.

The pump 136 can include an on-board controller 140, e.g., a microprocessor, a central processing unit (CPU), etc., configured to control the pump 136 based on the measured temperature. The controller 140 can be in communication with the sensor(s) configured to measure temperature and control the pump 136 based on measurements received from the sensor(s), e.g., turn the pump 136 on or off in accordance with the sensed temperatures. The pump 136 can include other electronic components configured to facilitate the controller's data processing, such as a memory, a printed circuit board, etc. In some embodiments, the controller can be located remotely from the pump 136 and can be in wired or wireless electronic communication therewith.

In some embodiments, the air 106 that enters the intake opening 132 can be heated. For example, the air entering the intake opening 132 can come from a supply of heated air.

Figure 3:
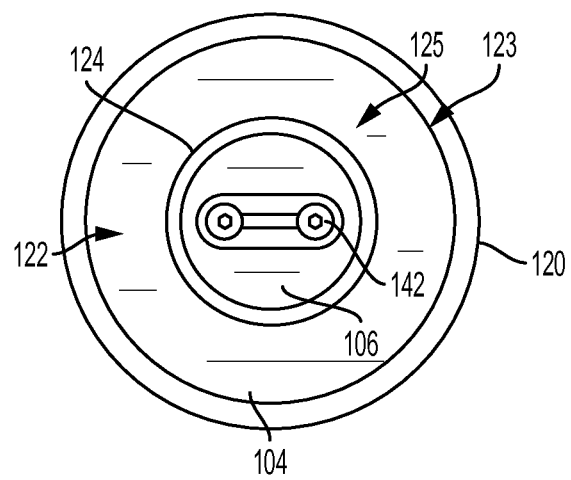
FIG. 3 is a cross-sectional view of the hose of FIG. 2.
Figures 4, 5:
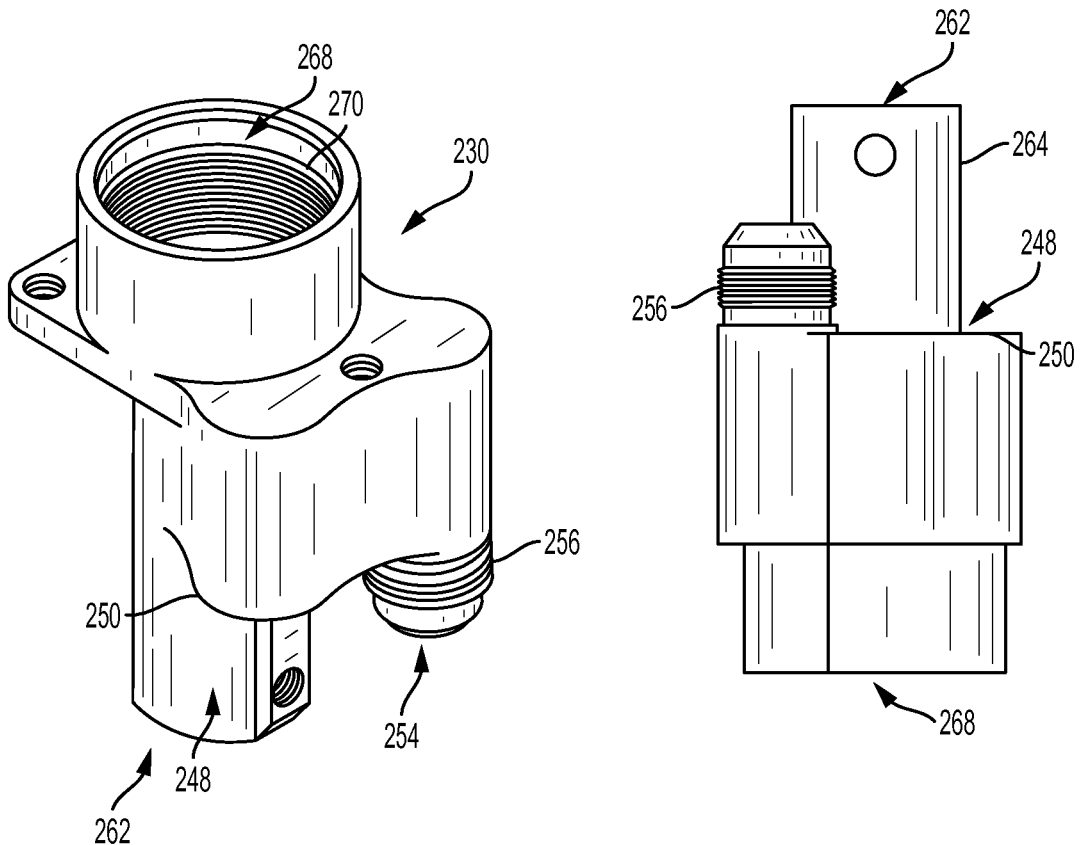
FIG. 4 is a perspective view of another embodiment of a manifold of a fuel dispensing device.
FIG. 5 is a side schematic view of another embodiment of a manifold of a fuel dispensing device.
Figure 6:
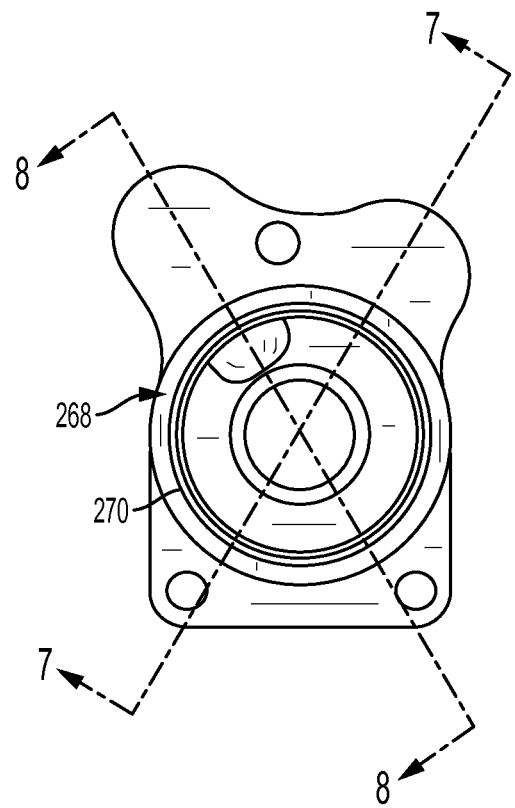
FIG. 6 is a top schematic view of the manifold of FIG. 5.
Figure 7:
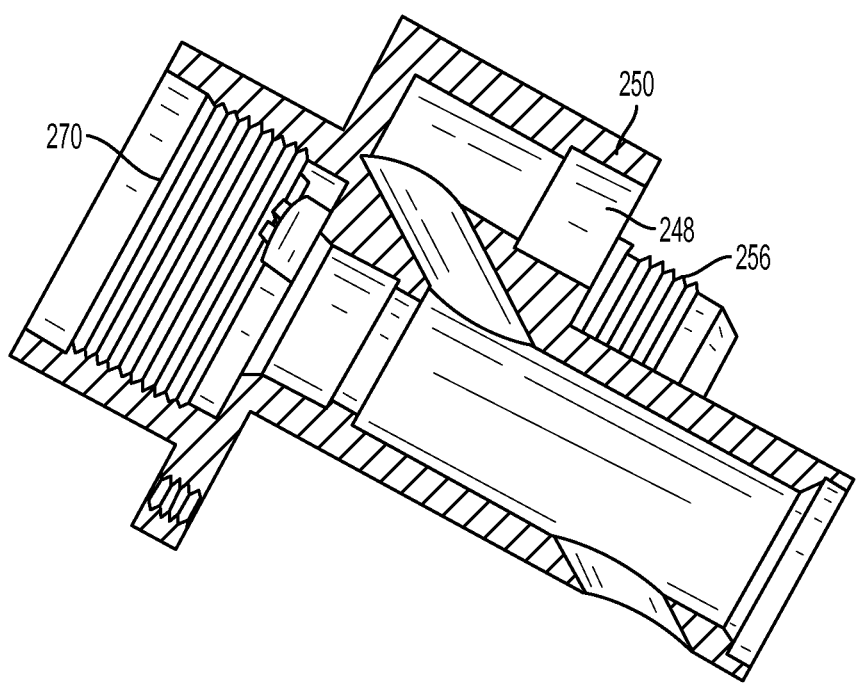
FIG. 7 is a cross-sectional schematic view of the manifold of FIG. 6.
Figure 8:
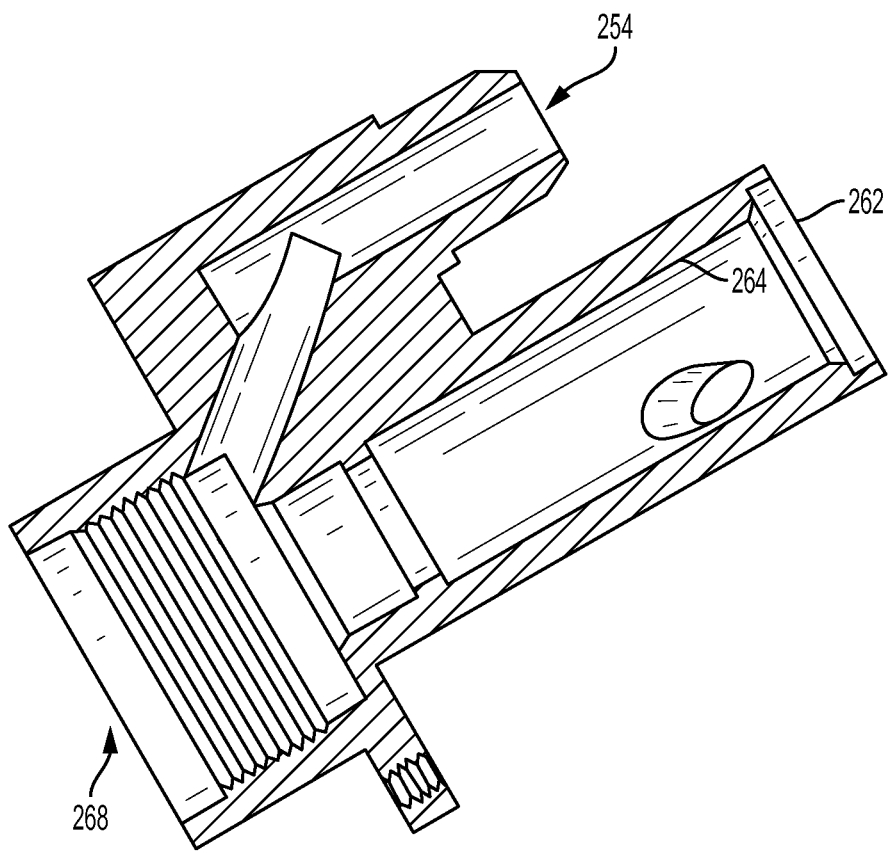
FIG. 8 is another cross-sectional schematic view of the manifold of FIG. 6.
Figure 9:
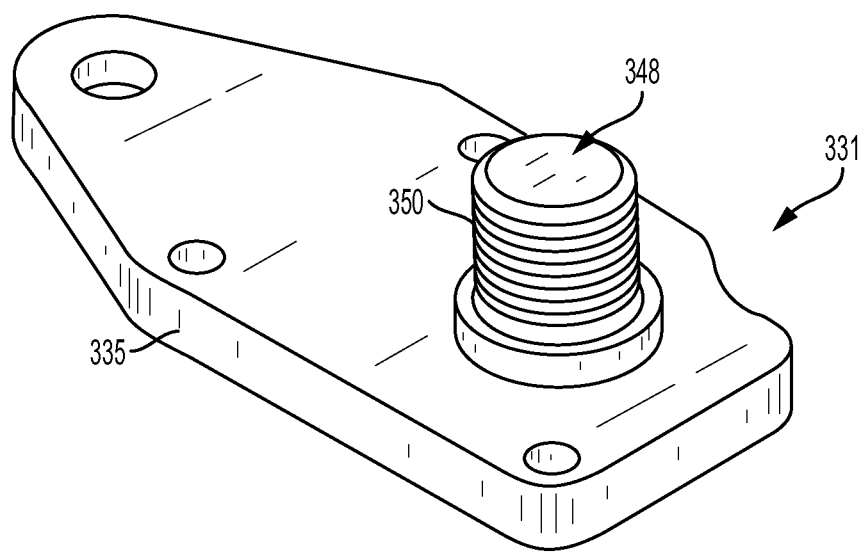
FIG. 9 is a perspective schematic view of a top portion of another embodiment of a manifold of a fuel dispensing device.
Figure 10:
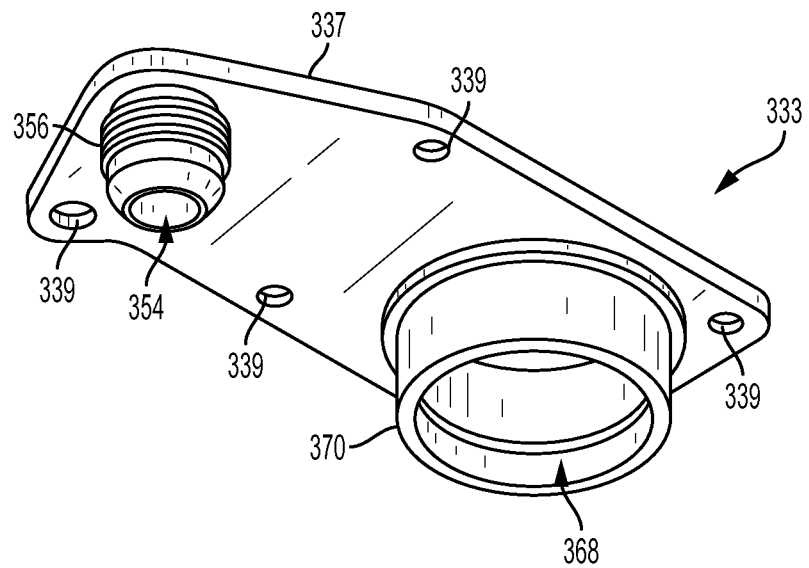
FIG. 10 is a perspective schematic view of a bottom portion of the manifold of FIG. 9.
Figure 11:
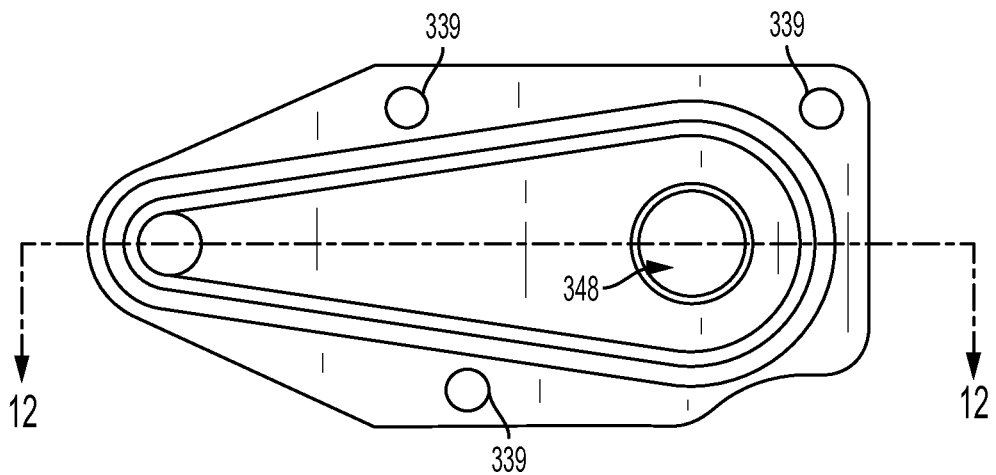
FIG. 11 is a bottom schematic view of the top portion of FIG. 9.
Figure 12:
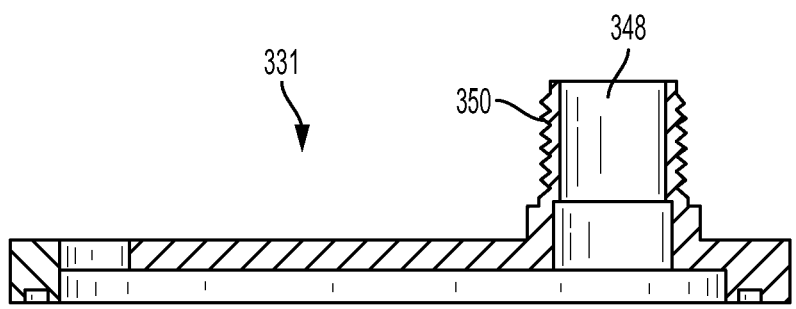
FIG. 12 is a side schematic cross-sectional view of the top portion of FIG. 11.
Figure 13:
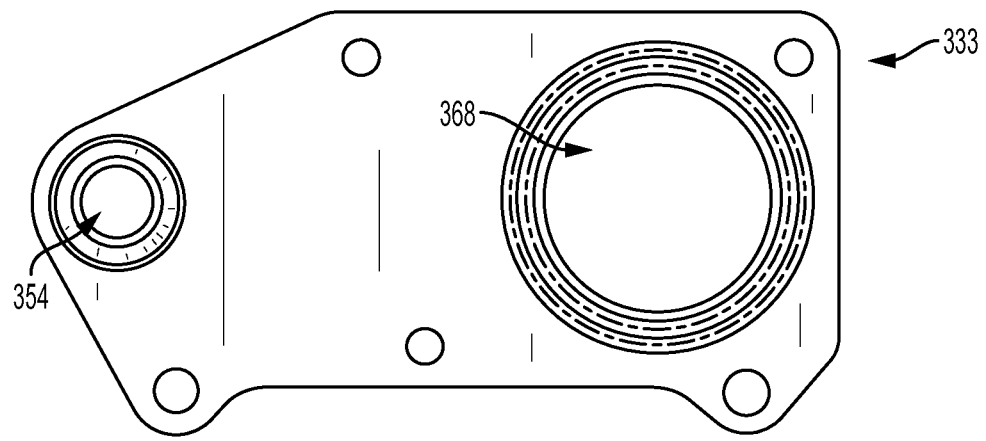
FIG. 13 is a bottom schematic view of the bottom portion of FIG. 10.
Figure 14:
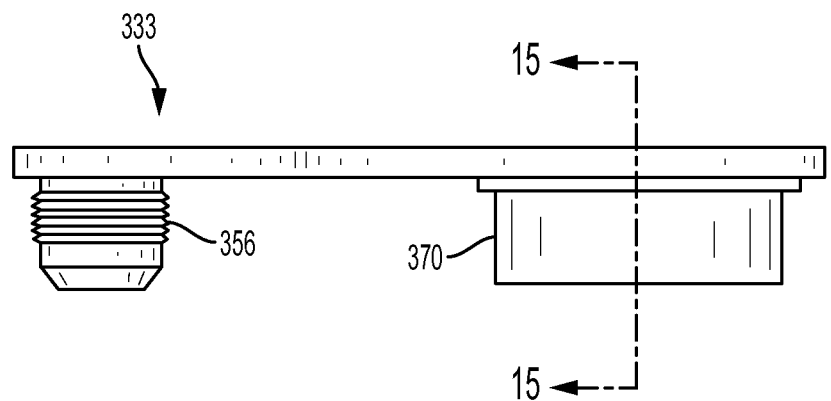
FIG. 14 is a side schematic view of the bottom portion of FIG. 10.
Figure 15:
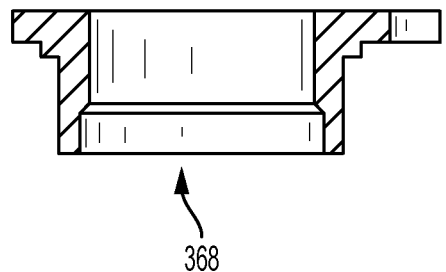
FIG. 15 is a side schematic cross-sectional view of a portion of the bottom portion of FIG. 14.

Alternatively, the air 106 that enters the intake opening 132 can be unheated, e.g., be ambient air. This can provide more flexibility to the system than providing heated air. In some embodiments, the intake opening 132 can have a heating element disposed therein configured to heat the air 106 as the air 106 passes therethrough. The air 106 can, however, lose heat as it travels from the intake opening 132 to the hose 100 and then to the nozzle 102. In some embodiments, as in this illustrated embodiment, as shown in FIGS. 1-3, the air passageway 124 can have a heating element 142 disposed therein. The heating element 142 can be configured to heat the air 106 as it passes thereby through the air tube 124. The heating element 142 is closer to the hose 100 and the nozzle 102 than a heating element disposed at the intake opening 132, which can more efficiently heat the air 106 and/or can more likely prevent freezing of the fluid 104 within the hose 100 and the nozzle 102. In some embodiments, a heating element can be provided at the intake opening 132 and another heating element can be provided within the air tube 124.

The heating element 142 can have a variety of sizes, shapes, and configurations. In some embodiments, the heating element 142 can include a positive temperature coefficient (PTC) heater configured to be self-regulating such that the colder the temperature (e.g., the colder the sensed ambient and/or fluid temperature), the more heat provided by the PTC heater. As in this illustrated embodiment, the heating element 142 can include a heat cable. Various heat cables can be used, as will be appreciated by a person skilled in the art, such as a Class I, Division 1 Underwriters Laboratories (UL) approved heater cable and such as a heat cable appropriate for usage in a hazardous area (e.g., a petrol station, etc.) and complying with European standard EN-13617.

The heating element 142 can be disposed within the hose 100, as shown in FIGS. 1 and 2, which can efficiently prevent the fluid 104 within the hose 100 from freezing with a relatively low amount of heating power, e.g., about 20 W per foot. The heating element 142 can extend through substantially an entire longitudinal length of the hose 100, as also shown in FIGS. 1 and 2, with a distal terminal end of the heating element 142 being located just proximal of the swivel 114 and hence located proximal of the nozzle 102. The hose 100 can be relatively long, e.g., in a range of about 10 to 12 feet, so having the heating element 142 disposed within a substantial longitudinal length of the hose 100 can help reduce the effects of thermodynamic loss, e.g., as opposed to a heating element located at one end of the hose 100 or a heating element not disposed within the hose 100 at all, and can help ensure that heat is provided to the fluid 104 in the nozzle 102 since the heat need not travel far from the heating element 142 to reach the fluid 104 in the nozzle 102.

The heating element 142 can, as shown in FIG. 2, be coupled to a power supply and control 144 configured to provide power, e.g., via battery, via electric power outlet, etc., to the heating element 142 via a heating element control cable 146 extending between the power supply and control 144 and the heating element 142. The power supply and control 144 can be configured to continuously heat the heating element 142. Continuously heating the heating element 142 can help ensure that the fluid 104 in the hose 100 and/or the nozzle 102 does not freeze, but this continuous heating can be expensive and/or increase risk of wearing out and/or otherwise damaging the heating element 142 and/or the power supply and control 144. In especially cold climates, however, continuously running the heating element 142 can be desirable. Alternatively, the power supply and control 144 can be configured to non-continuously, e.g., intermittently, heat the heating element 142. Non-continuously heating the heating element 142 can help reduce wear and tear on the heating element 142 and/or the power supply and control 144 and/or can help prevent the heating element 142 from providing heat when the fluid 104 is not at a temperature at which it may freeze or begin to freeze. The heating element 142 can be coupled to a housing (not shown) of the fuel dispensing device and can be located entirely inside the housing, entirely outside the housing, or partially inside and partially outside the housing. Similarly, the power supply and control 144 can be coupled to a housing (not shown) of the fuel dispensing device and can be located entirely inside the housing, entirely outside the housing, or partially inside and partially outside the housing. Locating the heating element 142 and/or the power supply and control 144 at least partially outside the housing can facilitate repair and/or upgrade of broken or outdated parts without requiring opening of the housing at all and/or opening of the housing in an easier way than if the part being repaired and/or upgraded is entirely within the housing.

The heating element 142 can be configured to provide heat 106 based on a measured temperature. Similar to that discussed above regarding the pump 136, if the measured temperature is above a predetermined threshold temperature, then the heating element 142 can be configured to not provide heat, e.g., the power supply and control 144 can be configured to not provide power to the heating element 142, and if the measured temperature is below the predetermined threshold temperature, then the heating element 142 can be configured to provide heat, e.g., the power supply and control 144 can be configured to provide power to the heating element 142. Also similar to that discussed above regarding the pump 136, the power supply and control 144 can include an on-board controller, as in this illustrated embodiment, or the controller can be located remotely from the power supply and can be in wired or wireless electronic communication therewith. The power supply and control 144 can include other electronic components configured to facilitate the controller's data processing, such as a memory, a printed circuit board, etc.

The movable element 114 can have a variety of sizes, shapes, and configurations. In an exemplary embodiment, the movable element 114 can be configured to rotate or "swivel" relative to the hose 100 about a longitudinal axis of the hose 100, which can allow the nozzle 102 to be desirably positioned relative thereto and accordingly improve usability of the fuel dispensing device.

The movable element 114 can be configured to break away from the hose 100 so as to allow the nozzle 102 to be detached from the hose 100 in response to an amount of force applied thereto. This can be a safety feature. For example, if a user accidentally drives away with the nozzle 102 still attached to their vehicle, the movable element 114, with the nozzle 102 attached thereto, can be break away from the hose 100, thereby avoiding potentially very serious damage caused by the hose 100 and/or the fuel dispensing device being pulled away due to the force of the moving vehicle.

The movable element 114 can include an adapter portion 117 and a breakaway portion 115 configured to facilitate the breaking away of the movable element 114, and the nozzle attached thereto 102, from the hose 100. The adapter portion 117 can be proximal to the breakaway portion 115 and can be configured to remain attached to the hose 100 in the event that the breakaway portion 115 is actuated in response to atypical force being applied to the nozzle 102 and/or the hose 100. The adapter portion 117 of the movable element 114 can be configured to be in a fixed position relative to the hose 100 so as to remain stationary thereto, with the breakaway portion 115 of the movable element 114 being configured to swivel as discussed herein.

The breakaway portion 115 can be configured to be self-sealing. The breakaway portion 115 can be configured automatically seal so as to close newly exposed open ends of the fuel passageway 122 and the air passageway 124 when the breakaway portion 115 "breaks." In this way, the breakaway portion 115 can be configured to prevent the fuel 104 from leaking out of the fuel passageway 122 and to prevent the air 106 from leaving out of the air passageway 124 in the event that the movable element 114, and the nozzle 102 attached thereto, are separated from the hose 100. The breakaway portion 115 can be located outside of the nozzle 102, e.g., entirely proximal to the nozzle 102, as in this illustrated embodiment, which can allow for improved flexibility in nozzle designs and/or for easier manufacturing of nozzles. The breakaway portion 115 can be located entirely distal to the heating element 142, which can help prevent damage to the heating element 142 in the event that the breakaway portion 115 is activated when the nozzle 102 is separated from the hose 110. The breakaway portion 115 can be configured to self-seal in a variety of ways. As in this illustrated embodiment, the breakaway portion 115 can include one or more sealing elements 121 configured to pinch together upon the breaking, thereby sealing the fuel passageway 122 and the air passageway 124.

The movable element 114 can include a break region 119 configured to facilitate the breaking away of the breakaway portion 115 from the adapter portion 117 and from the hose 100. The break region 119 can include scoring that extends circumferentially around the movable element 114, as in this illustrated embodiment, although the break region 119 can have other configurations, e.g., a weakened area of thinner and/or different material than a remainder of the movable element's sidewall.

The manifold 130 can have a variety of sizes, shapes, and configurations. The manifold 130, shown in FIG. 2, can be configured to facilitate passage of the fluid 104 from the fluid supply 126 into the hose 100 and passage of the air 106 from the air supply into the hose 100 without the fluid 104 mixing with the air 106. The manifold 130 can include a first opening 148 through which the air 106 can flow from the air supply, e.g., into which the pump 136 can pump the air 106. Adjacent the first opening 148 can be a first coupling element 150 configured to mate with the air supply, e.g., with a tube 152 through which the air 106 flows from the pump 136. The first coupling element 150 in this illustrated embodiment includes a tube into which the tube 152 can mate by, e.g., interference fit.

The manifold 130 can include a second opening 154 through which the fluid 104 can flow from the fluid supply 126. Adjacent the second opening 154 can be a second coupling element 156 configured to mate with the fluid supply 126, e.g., with a tube 158 through which the fluid 104 flows. The second coupling element 156 in this illustrated embodiment includes a thread configured to threadably mate with a threaded member 160 at an end of the tube 158. The first and second openings 148, 154 can not be in fluid communication, which can help prevent the fluid 104 passing through the second opening 154 from mixing with the air 106 passing through the first opening 148.

The manifold 130 can include a third opening 162 into which the control cable 146 can extend. Adjacent the third opening 162 can be a third coupling element 164 configured to mate with the control cable 146, e.g., with a coupling element 166 at an end of the control cable 146. The third coupling element 164 in this illustrated embodiment includes a tube into which the coupling element 166 can mate by, e.g., interference fit. The third opening 162 can be in communication with the first opening 148, which can allow the heating element 142 and the air 106 to be in contact with one another. The third opening 162 can thus not be in communication with the second opening 154, similar to the first opening 148.

The manifold 130 can include a fourth opening 168 through which the air 106 can flow after entering the manifold 130 through the first opening, through which the fluid 104 can flow after entering the manifold through the second opening 154, and through which the heating element 142 extending from the coupling element 166 at the third opening 162 can extend. Adjacent the fourth opening 168 can be a fourth coupling element 170 configured to mate with the hose 100, e.g., with a proximal end thereof that is opposite to a distal end thereof configured to mate to the nozzle 102. The fourth coupling element 170 in this illustrated embodiment includes a thread configured to threadably mate with a thread 172 at the proximal end of the hose 100.

FIG. 4-8 illustrates another embodiment of a manifold 230. The manifold 230 in this illustrated embodiment includes a first opening 248 through which air can flow, a first coupling element 250 configured to mate with an air supply, a second opening 254 through which fluid can flow, a second coupling element 256 configured to mate with a fluid supply, a third opening 262 through which a heating element control cable can extend, a third coupling element 264 configured to mate with the control cable, a fourth opening 268 through which the air and the fluid can flow and through which the heating element can extend, and a fourth coupling element 270 configured to mate with a hose. In this illustrated embodiment, the first coupling element 250 includes a tube, the second coupling element 256 includes a thread, the third coupling element 264 includes a thread, and the fourth coupling element 266 includes a thread. Like the manifold 130 of FIG. 2, the manifold 230 in this illustrated embodiment is a unitary piece, e.g., a singular element.

FIGS. 9-15 illustrate another embodiment of a manifold (not shown assembled) that includes a first, upper portion 331 and a second, lower portion 333. A first base 335 of the first portion 331 can be configured to face and mate with a second base 337 of the second portion 333 to form the manifold. In an exemplary embodiment, flat surfaces of first and second bases 335, 337 can face one another and be mated together via a plurality of screws inserted through mating holes 339 formed in each of the first and second portions 331, 333, although the first and second portions 331, 333 can be mated together in any combination of one or more ways, e.g., screws, adhesive, welding, etc. A sealing element, e.g., an o-ring, can be disposed therebetween to provide fluid sealing between the first and second portions 331, 333.

The manifold in this illustrated embodiment includes a first opening 348 through which air can flow, a first coupling element 350 configured to mate with an air supply, a second opening 354 through which fluid can flow, a second coupling element 356 configured to mate with a fluid supply, a fourth opening 368 through which the air and the fluid can flow and through which a heating element can extend, and a fourth coupling element 370 configured to mate with a hose. In this illustrated embodiment, the first opening 348 can be configured to also have the heating element control cable extend therethrough. In this illustrated embodiment, the first coupling element 350 includes a thread, the second coupling element 356 includes a thread, and the fourth coupling element 366 includes a tube. The manifold in this illustrated embodiment is a non-unitary, multi-piece member.

FIGS. 16-20 illustrate another embodiment of a fuel dispensing device 401 configured to heat fluid (not shown) that can be dispensed therefrom. The device 401 can include a hose 400, a nozzle 402, a heating element (not shown), a movable element 414, and a manifold 430. The hose 400 can be configured as a coaxial hose and include at least two coaxial tubes, e.g., an outer tube 420 and an inner tube (not shown). The nozzle 402 can include a dispensing trigger 408, a fluid exit opening 410, and an air exit opening 412. Like the nozzle 102 of FIG. 1, the nozzle 402 of FIGS. 16-18 can have the fluid exit opening 410 located distal to the air exit opening 412. This relative positioning can allow the heated air to pass through the air exit opening 412 at any time regardless of whether or not the nozzle 402 is seated in a nozzle boot 403 and regardless of whether or not the fluid is passing through the fluid exit opening 410.

The device 401 can include a housing 405 configured to be securely mounted to the ground and/or other stable area. The housing 405 can have the nozzle boot 403 formed therein. The housing 405 can have a second nozzle boot 407 formed therein configured to seat a second nozzle (not shown) similar to the nozzle 402 that can be coupled to a hose (not shown) similar to the hose 400, which can be coupled to a manifold (not shown) similar to the manifold 430.

Figure 16:
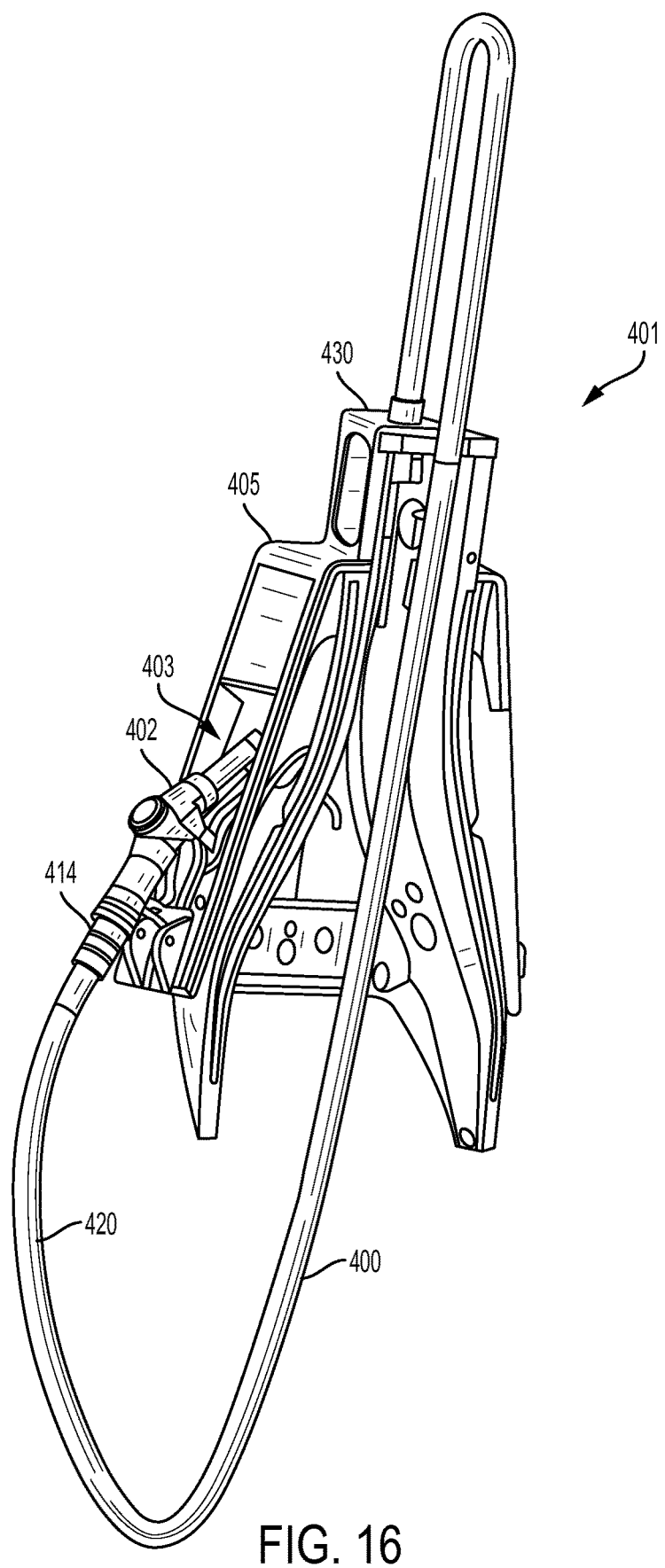
FIG. 16 is a perspective schematic view of an embodiment of a fuel dispensing device including a hose and a nozzle.
Figure 17:
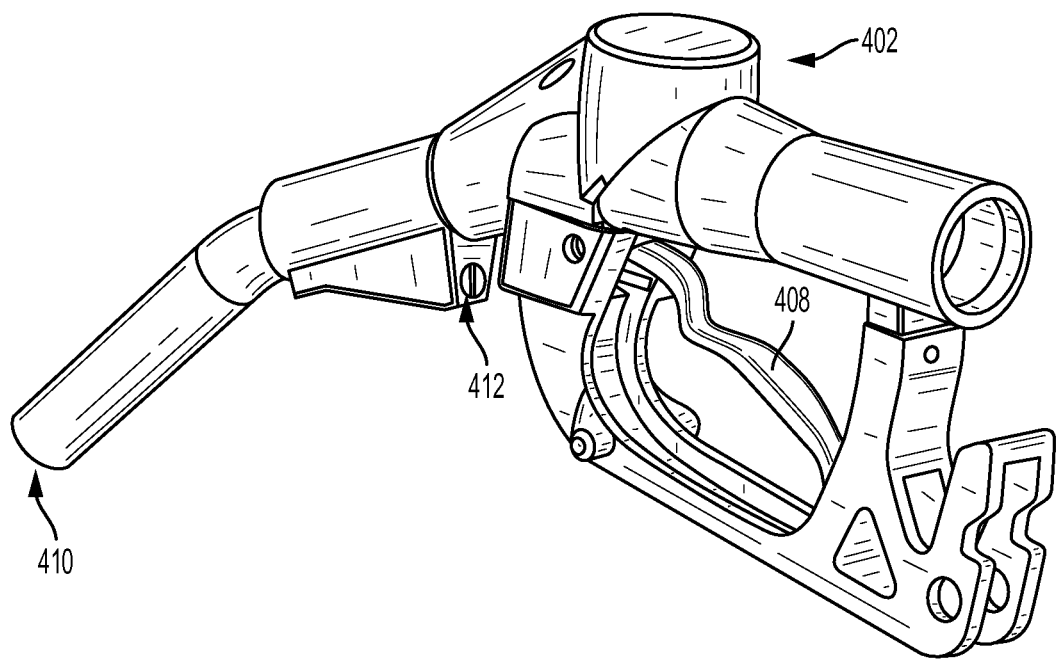
FIG. 17 is a perspective view of the nozzle of FIG. 16.
Figure 18:
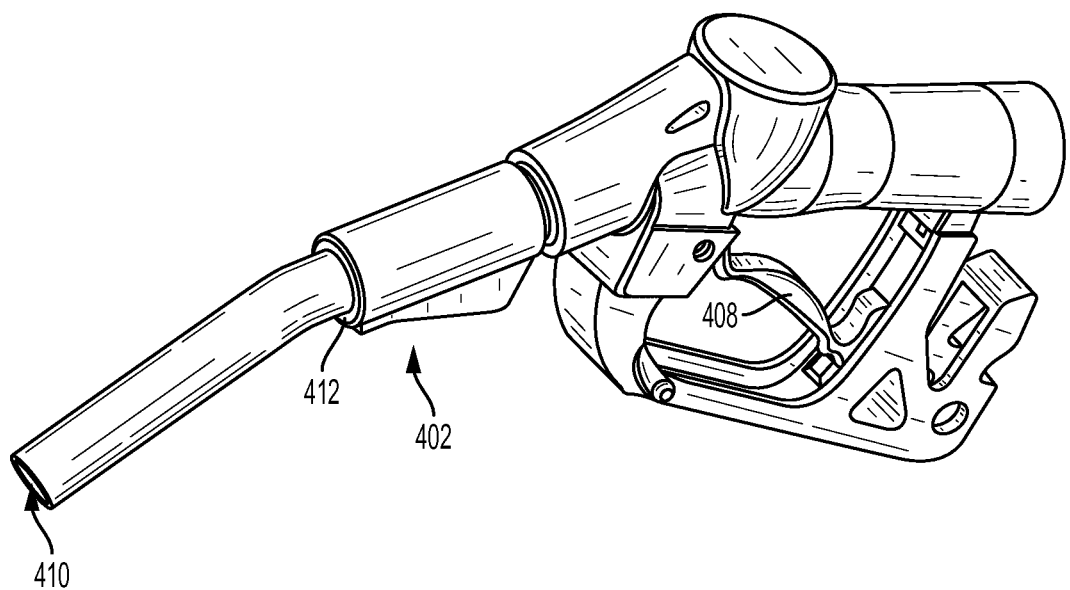
FIG. 18 is a perspective schematic view of the nozzle of FIG. 16.
Figure 19:
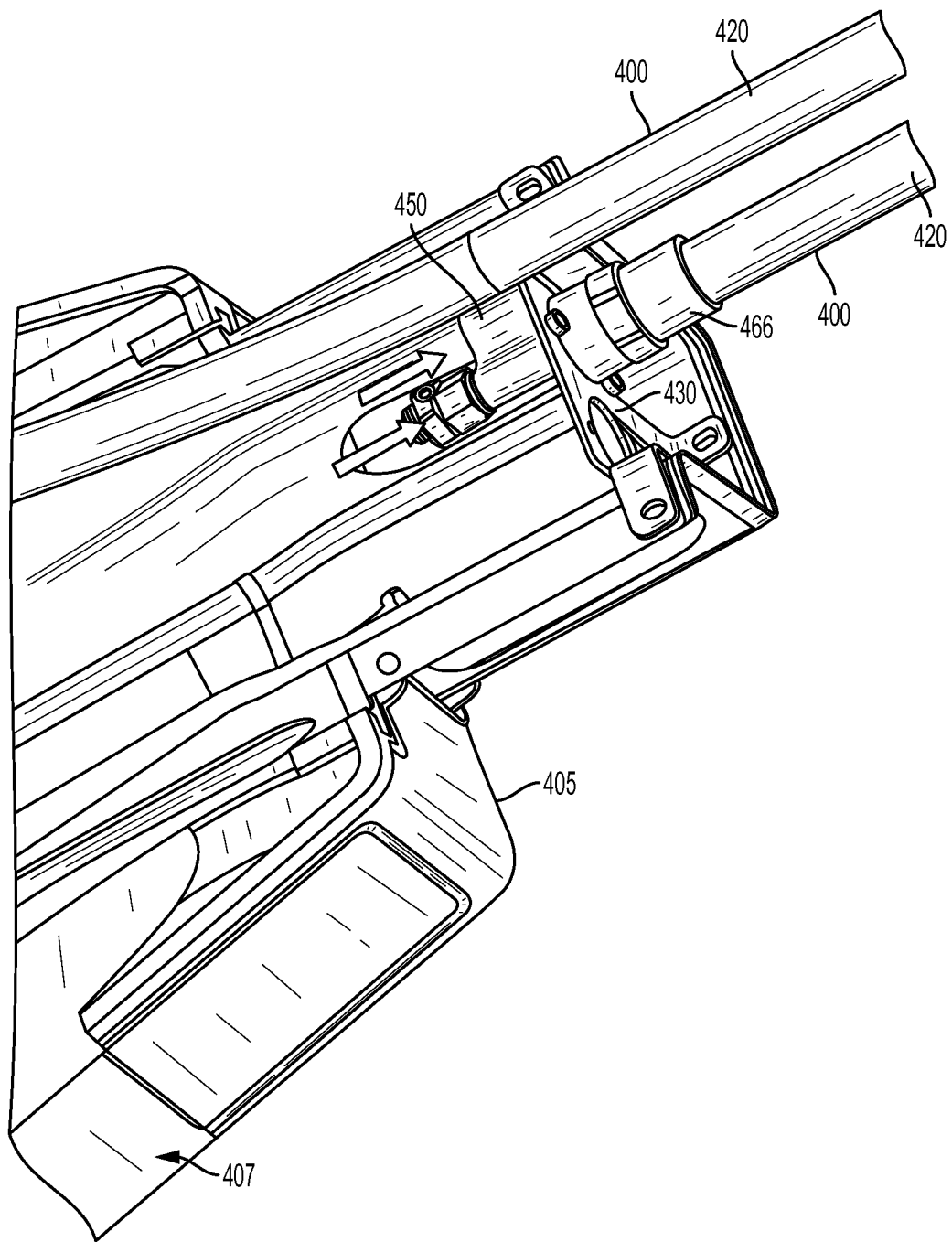
FIG. 19 is a perspective schematic view of a portion of the fuel dispensing device of FIG. 16 including a manifold.
Figure 20:
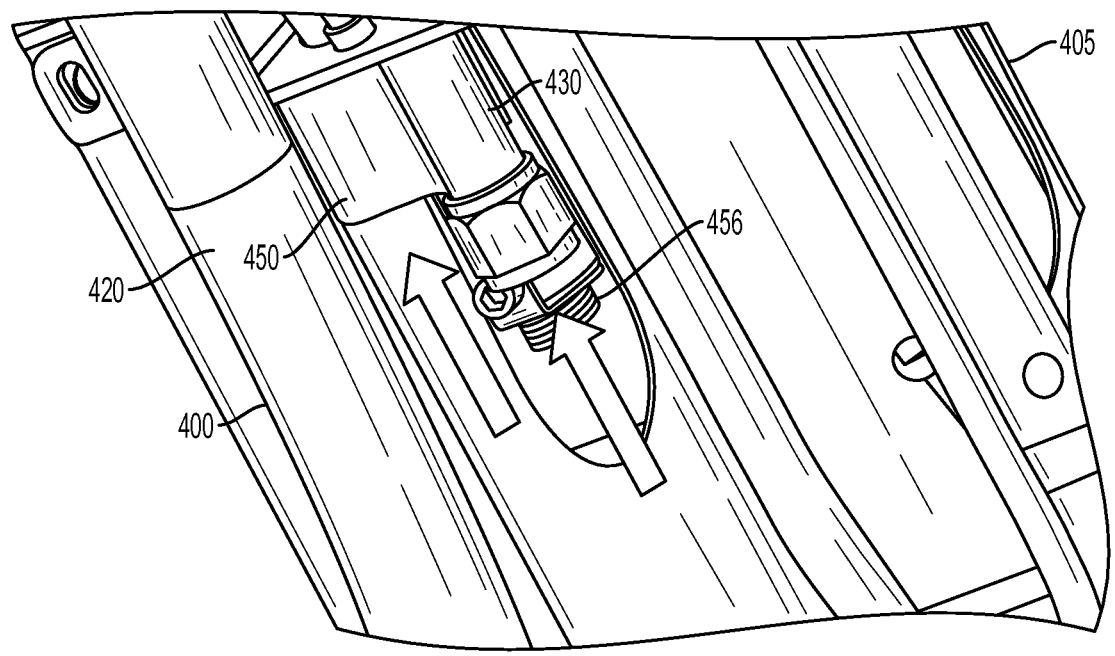
FIG. 20 is another perspective schematic view of the portion of FIG. 19.

The manifold 430 in this illustrated embodiment is a unitary member, as shown in FIGS. 16, 19, and 20. The manifold 430 can be fixedly mounted to the housing 405, as in this illustrated embodiment. The manifold 430 is disposed within the housing 405 in this illustrated embodiment, but a manifold can be fully or partially located outside a housing. Locating the manifold at least partially outside the housing can facilitate repair and/or upgrade of broken or outdated parts without requiring opening of the housing at all and/or opening of the housing in an easier way than if the part being repaired and/or upgraded is entirely within the housing. The manifold 430 can include a first opening through which air can flow, a first coupling element 450 configured to mate with an air supply, a second opening through which fluid can flow, a second coupling element 456 configured to mate with a fluid supply, a fourth opening through which the air and the fluid can flow and through which a heating element can extend, and a fourth coupling element 466 configured to mate with the hose 400. In this illustrated embodiment, the first opening can be configured to also have a heating element control cable extend therethrough. In this illustrated embodiment, the first coupling element 450 includes a tube, the second coupling element 456 includes a thread, and the fourth coupling element 466 includes a thread.

Figure 21:
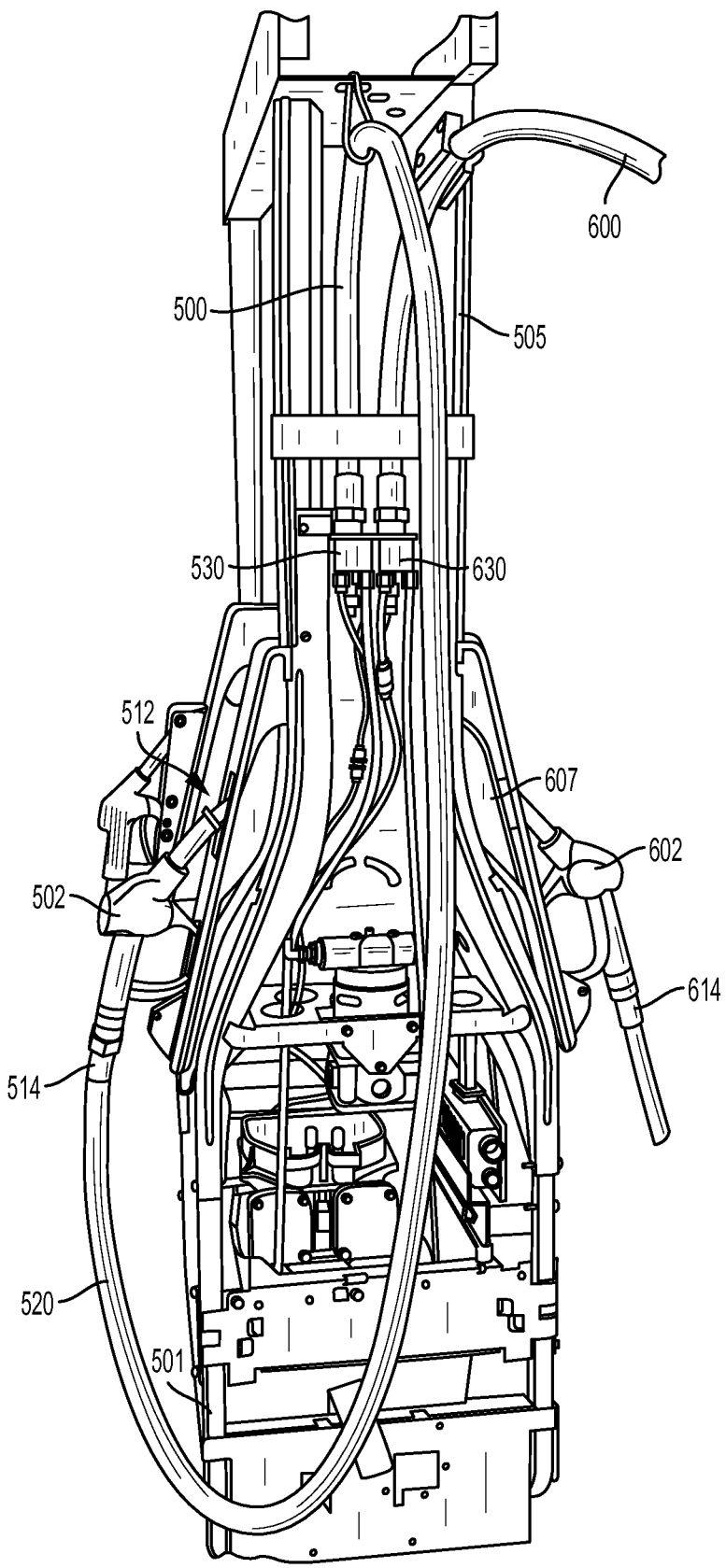
FIG. 21 is a perspective view of another embodiment of a fuel dispensing device including a hose and a nozzle.
Figure 22:
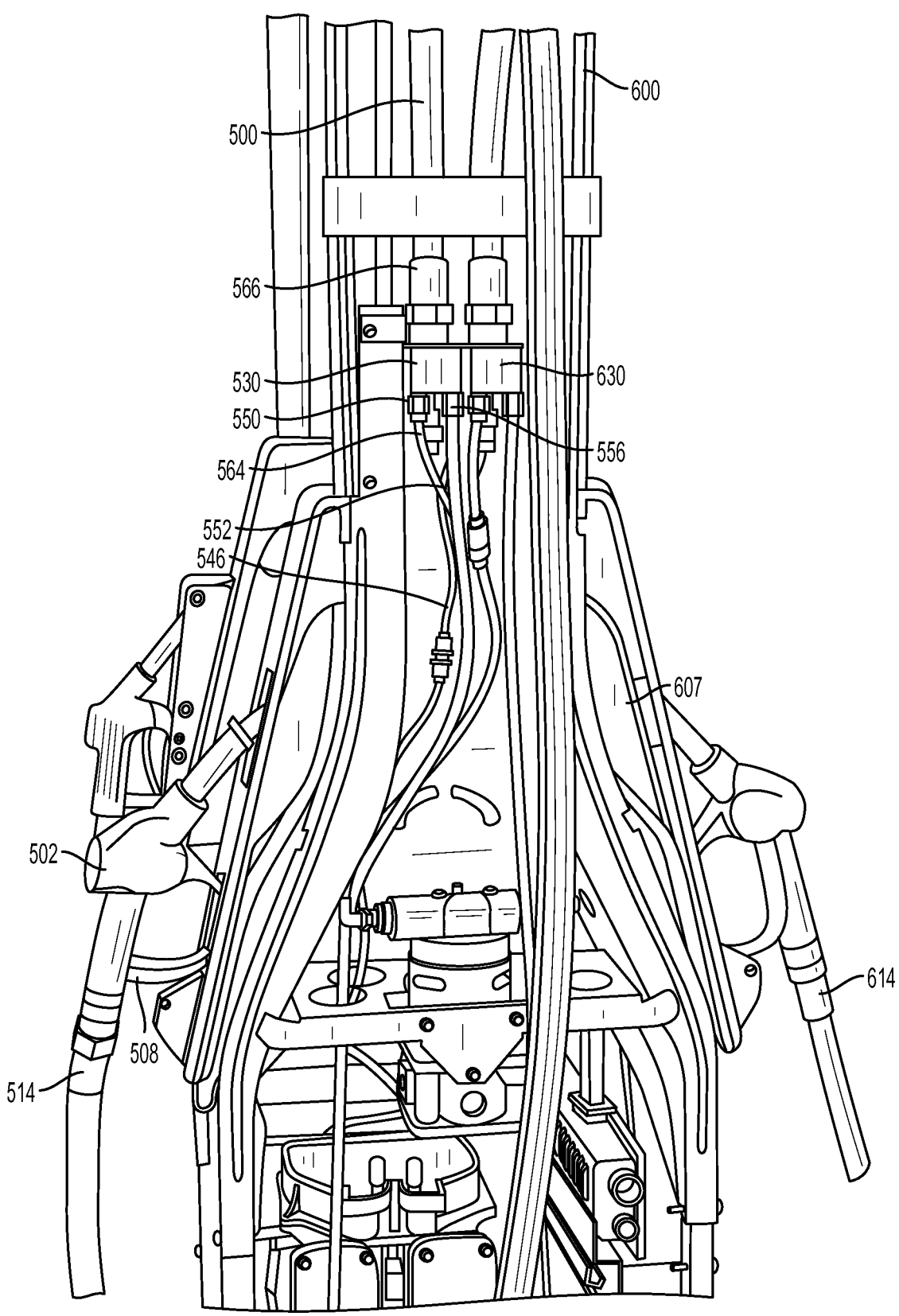
FIG. 22 is a perspective view of a portion of the fuel dispensing device of FIG. 21 including a manifold.
Figure 23:
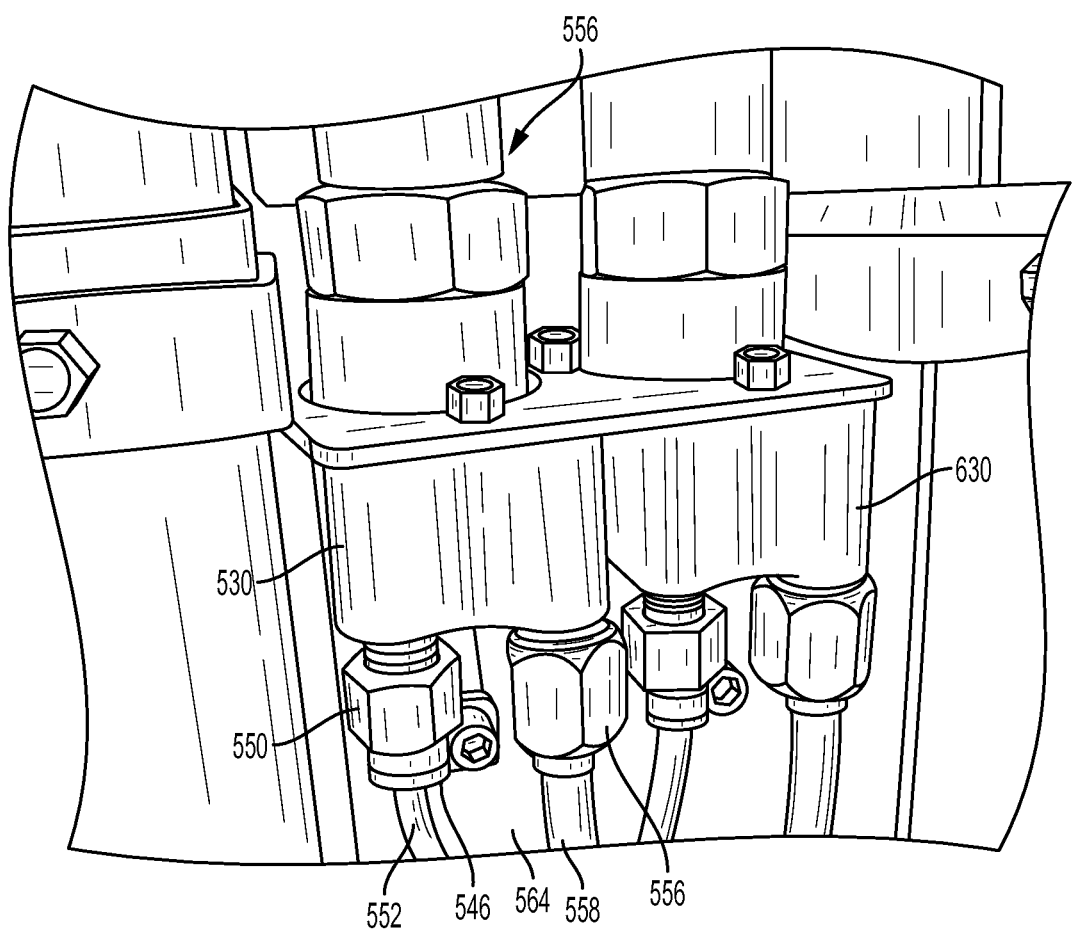
FIG. 23 is another perspective view of a portion of the fuel dispensing device of FIG. 21 including a manifold.

FIGS. 21-23 illustrate another embodiment of a fuel dispensing device 501 configured to heat fluid (not shown) that can be dispensed therefrom. The device 501 can include a housing 505, a hose 500, a nozzle 502, a nozzle boot 503, a heating element (not shown), a movable element 514, and a manifold 530. The hose 500 can be configured as a coaxial hose and include at least two coaxial tubes, e.g., an outer tube 520 and an inner tube (not shown). The nozzle 502 can include a dispensing trigger 508, a fluid exit opening (not shown), and an air exit opening 512. Like the nozzle 102 of FIG. 1, the nozzle 502 of FIGS. 21 and 22 can have the fluid exit opening located distal to the air exit opening 512.

Similar to the manifold 430 of FIGS. 16, 19, and 20, the manifold 530 of FIGS. 21-23 is a unitary member and is fixed to the housing 501. The manifold 530 can include a first opening through which air can flow, a first coupling element 550 configured to mate with an air supply, a second opening through which fluid can flow, a second coupling element 556 configured to mate with a fluid supply, a third opening through which a heating element control cable 546 can extend, a third coupling element 564 configured to mate with the control cable 546, a fourth opening through which the air and the fluid can flow and through which a heating element can extend, and a fourth coupling element 566 configured to mate with the hose 500. In this illustrated embodiment, the first, second, third, and fourth coupling elements 550, 556, 564, 566 each include a thread. FIGS. 21-23 also show a tube 558 mated to the second coupling element 556 and through which the fluid flows, and show a tube 552 mated to the first coupling element 550 and through which the air flows.

The device 501 in this illustrated embodiment also includes a second hose 600, a second nozzle 602, a second nozzle boot 607, a second heating element (not shown), a second movable element 614, and a second manifold 630 similar to the hose 500, the nozzle 502, the nozzle boot 503, the heating element (not shown for the hose 500 and nozzle 502 in this illustrated embodiment), the movable element 514, and the manifold 530.

Figure 24:
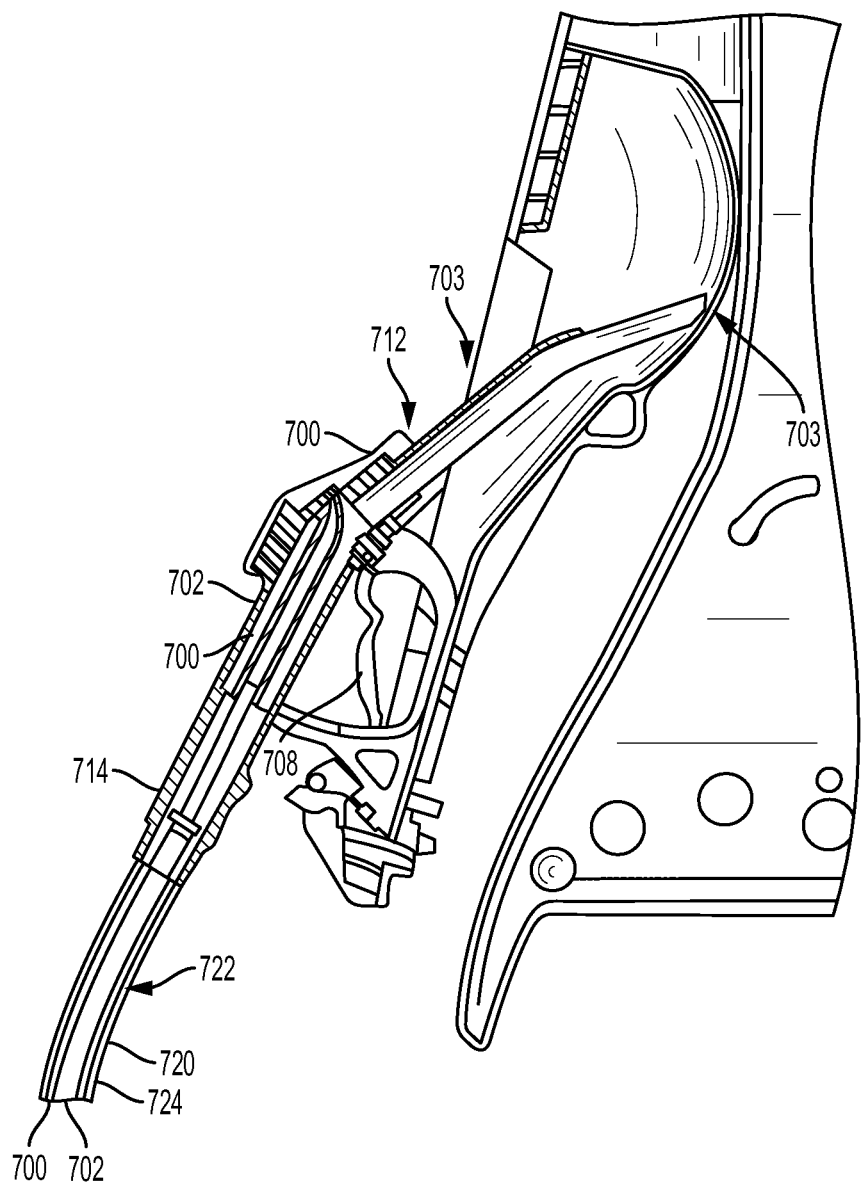
FIG. 24 is a side partially cross-sectional view of a hose and a nozzle of a fuel dispensing device.
Figure 25:
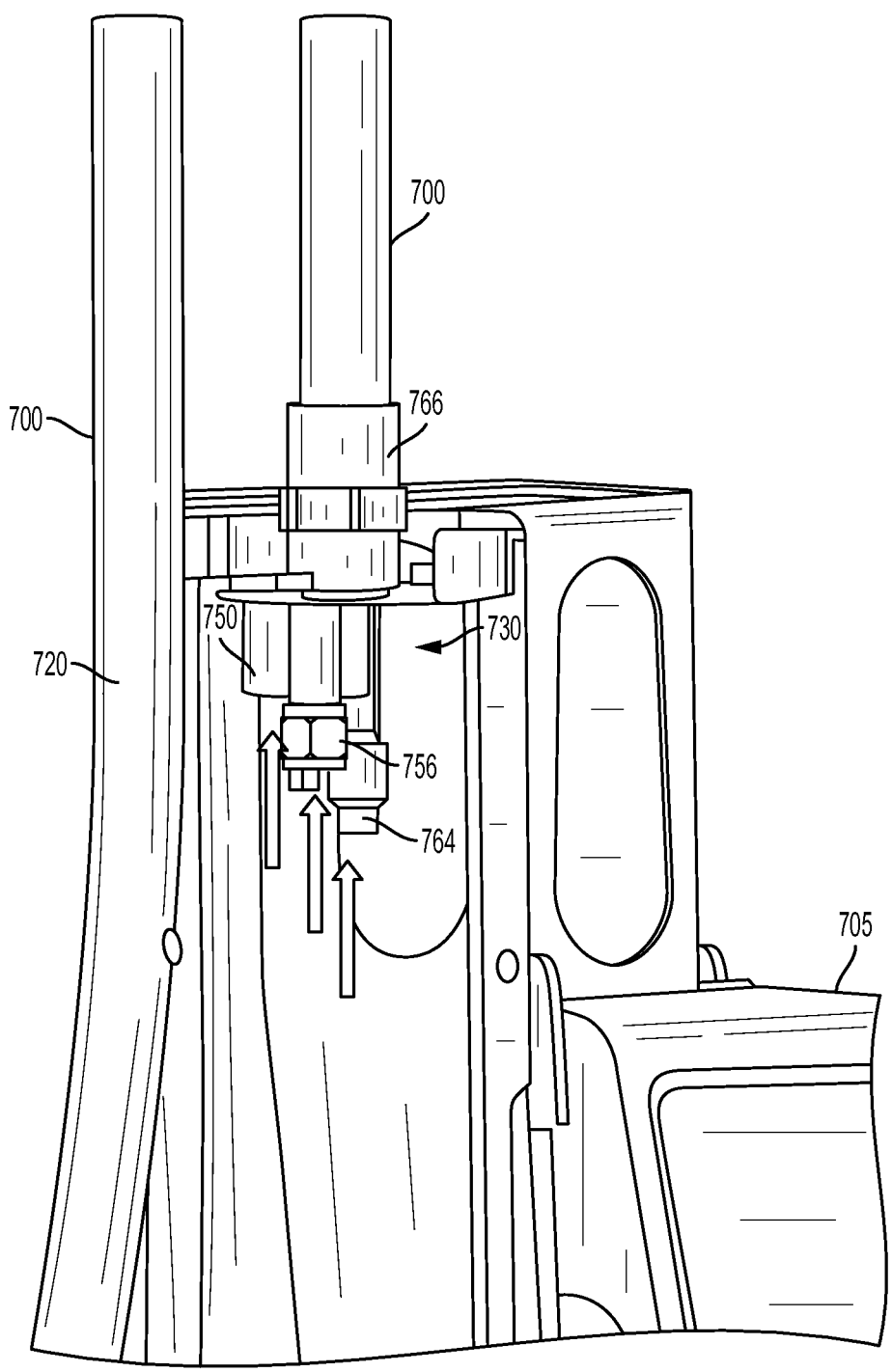
FIG. 25 is a perspective view of another portion of the fuel dispensing device of FIG. 24.

FIGS. 24 and 25 illustrate another embodiment of a fuel dispensing device configured to heat fluid 700 that can be dispensed therefrom. The device can include a housing 705, a hose 700, a nozzle 702, a nozzle boot 703, a heating element (not shown), a movable element 714, and a manifold 730. The hose 700 can be configured as a coaxial hose and include at least two coaxial tubes, e.g., an outer tube 720, a fluid passageway 722, and an air tube 724. The nozzle 702 can include a dispensing trigger 708, a fluid exit opening (not shown), and an air exit opening 712. Like the nozzle 102 of FIG. 1, the nozzle 702 of FIG. 24 can have a fluid exit opening 710 located distal to an air exit opening 712.

Similar to the manifold 430 of FIGS. 16, 19, and 20, the manifold 730 of FIG. 25 is a unitary member and is fixed to the housing 701. The manifold 730 can include a first opening through which air can flow, a first coupling element 750 configured to mate with an air supply, a second opening through which fluid can flow, a second coupling element 756 configured to mate with a fluid supply, a third opening through which a heating element control cable (not shown) can extend, a third coupling element 764 configured to mate with the control cable, a fourth opening through which the air and the fluid can flow and through which the heating element can extend, and a fourth coupling element 766 configured to mate with the hose 700. In this illustrated embodiment, the first, second, third, and fourth coupling elements 750, 756, 764, 766 each include a thread.

Figure 26:
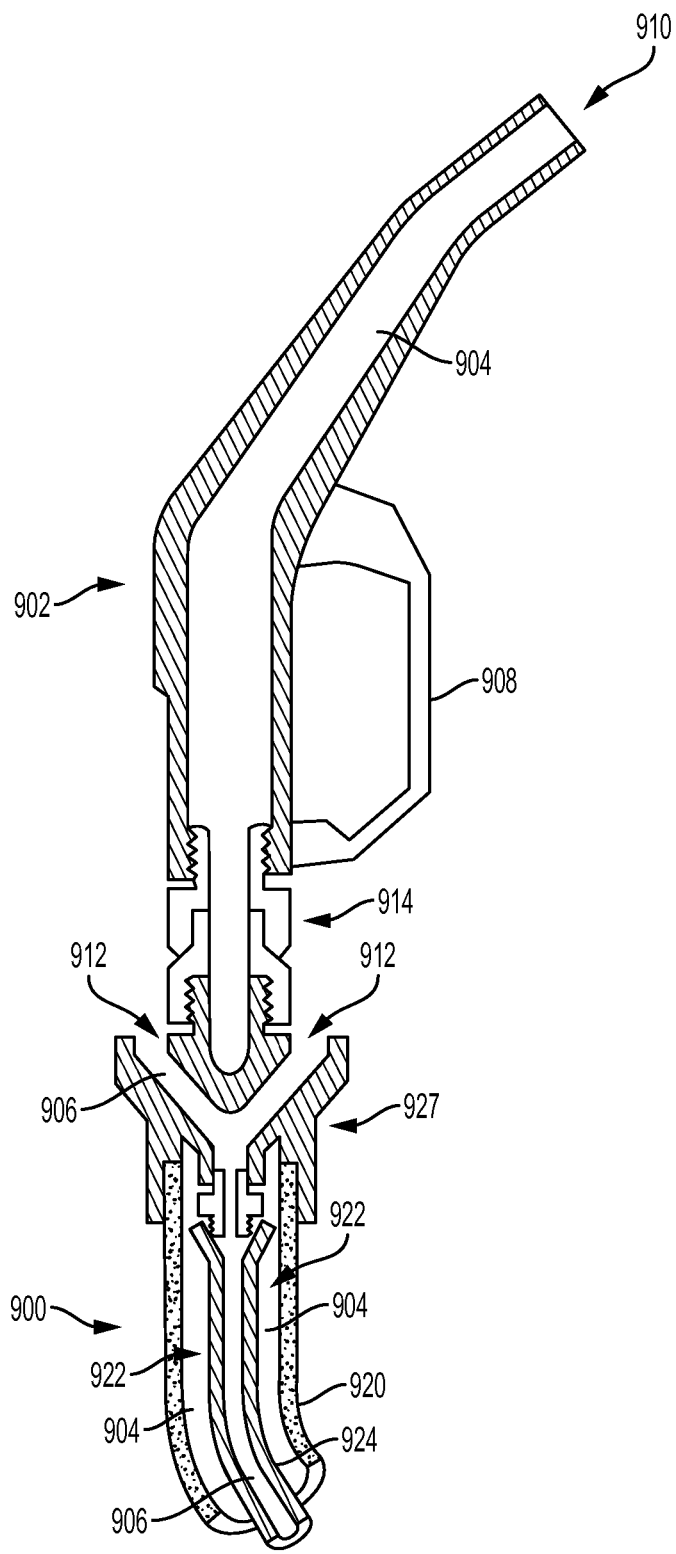
FIG. 26 is a side schematic cross-sectional view of another embodiment of a fuel dispensing device.

FIG. 26 illustrates another embodiment of a fuel dispensing device configured to heat fluid 904 that can be dispensed therefrom. The device can include a hose 900, a nozzle 902, a heating element (not shown), an air exit opening 912, a movable element 914, and a manifold (not shown). The hose 900 can be configured as a coaxial hose and include at least two coaxial tubes, e.g., an outer tube 920 and an inner tube 924. The nozzle 902 can include a dispensing trigger 908, and a fluid exit opening 910. The nozzle 902 of FIG. 26 can have the fluid exit opening 910 located distal to the air exit opening 912. The air exit opening 912 can be from the hose 900 such that air 906 exiting the air exit opening 912 does not enter the nozzle 902. Instead, the exiting air 906 can flow outside of the nozzle 902 so as to facilitate heating of the nozzle 902 from an exterior thereof. In other words, the air passageway through which the air 906 flows can be located within the hose 900 but not within the nozzle 902. The hose 900 can thus be configured to be used with existing nozzles such that the nozzles need not be retrofitted for heating using the coaxial heating system disclosed herein.

The fuel dispensing device can include an air diverter 927 configured to facilitate flow of the fluid 904 into the nozzle 902 without mixing the air 906 with the fluid 904 and while allowing the air 906 to exit from the air exit opening 912. In other words, the air diverter 927 can be configured to divert the air 906 within the hose 900, e.g., within the inner tube 924, to an area outside the nozzle 902 while allowing the fluid 904 within the hose 900, e.g., within a gap of space 922 between the inner and outer tubes 920, 924, to flow into the nozzle 902. As in the illustrated embodiment, the air diverter 927 can be located proximal to the movable element 914, which can facilitate retrofitting to existing nozzles and/or can help maintain heated air flow around the nozzle 902 even during use of the nozzle 902 by a user.

In some embodiments, a fuel dispensing system can include a nozzle that includes an air intake opening instead of an air exit opening. The air intake opening can be similar to the air exit openings described herein except that instead of heated air passing through the nozzle in a distal direction and exiting the nozzle through the air exit opening, heated air can pass through the nozzle in a proximal direction and enter the nozzle through the air intake opening. The heated air that enters the nozzle through the air intake opening can pass into the hose from the nozzle, thereby allowing fuel to be heated within the hose as well as within the nozzle. The hose can include an air exit opening similar to the air exit openings described herein for nozzles, thereby allowing the heated air to exit the system. The hose's air exit opening can allow the air to be released directly into the atmosphere or to first be released into an element of the fuel dispensing system, such as a housing, before being released into the atmosphere.

The heated air can be provided to the nozzle for entry into the nozzle in a variety of ways. For example, an air supply similar to those described herein can be coupled to a nozzle boot configured to selectively seat the nozzle. The air supply can be configured to supply the air in a heated state into proximity of the nozzle, e.g., into a nozzle boot that seats the nozzle, into a shroud that covers the nozzle, etc. The heated air can then be allowed to enter the nozzle's air intake opening.

Because the air is heated prior to entering either the nozzle or the hose when the nozzle is configured to have the heated air enter therein, a heating element need not be disposed within either the nozzle or the hose. This can facilitate manufacturing of the nozzle and the hose.

In some embodiments, a nozzle including an air intake opening can also include an air exit opening. In such an embodiment, the hose need not include an air exit opening even though the heated air that enters the nozzle may also be able to enter the hose so as to heat fuel therein. The hose not including an air exit opening can make the system easier to manufacture and/or maintain since conventional hoses can be used and/or heated air can exit from an element (e.g., the nozzle) that can be already exposed to the outside environment by virtue of its accessibility in a nozzle boot.

In some embodiments, a fuel dispensing device can include an air containment mechanism configured to facilitate heating of the fuel dispensing device's nozzle using heated air that exits the nozzle, e.g., through an air exit opening thereof, or that enters the nozzle, e.g., through an air intake opening thereof. In an exemplary embodiment, the air containment mechanism can be configured to facilitate heating of the nozzle's spout, e.g., the nozzle's fluid exit opening, which as mentioned above can be more prone to fluid freezing due to its closer proximity to weather than other portions of the nozzle and hose. The air containment mechanism can be configured to help contain the heated air in proximity with the nozzle, e.g., the nozzle's spout, whether the heated air is released from the nozzle or is supplied in proximity of the nozzle for entry into the nozzle. The air containment mechanism can thus effectively use "waste" heated air to further help prevent the freezing of fluid.

The fuel dispensing device can include a sensor in proximity of the air containment mechanism, e.g., attached to the nozzle adjacent the air exit opening, attached to the nozzle boot, attached to the nozzle adjacent the air intake opening, etc., and configured to sense an ambient temperature. By using this sensor alone or in combination with other sensors configured to sense temperature, heating can be more efficiently controlled, e.g., turned on or off in response to temperature, so as to better help ensure that fluid does not freeze and that heat is provided when necessary and not provided when unnecessary.

The air containment mechanism can be configured to be a passive element that a user of the fuel dispensing device need not manipulate, e.g., remove, open, etc., in order to handle the nozzle and dispense fluid therefrom. The user's experience can thus be akin to the user's current dispensing expectations, which can help provide for a better user experience than at least some traditional heating techniques, such as a shroud that a user must move and/or remove prior to dispensing.

The air containment mechanism can be located at a portion of a fuel dispensing device's housing that seats the nozzle, e.g., a nozzle boot of the device. In this way, the fuel dispensing device can be configured to heat the nozzle when not in use, e.g., when fluid is not being dispensed therefrom, which can be when the fluid is more likely to freeze since it is not flowing and in motion.

The air containment mechanism can include a cavity open at a bottom thereof and closed upwards, similar to an awning. In an exemplary embodiment, the cavity can be located in the nozzle boot portion of the fuel dispensing device with the open bottom of the cavity being located in a direction toward the ground on which the fuel dispensing device is seated. The open bottom can be completely open, e.g., unobscured by any material, or the open bottom can be partially open, e.g., at least partially obscured by a material. For a semi-open bottom, the material at least partially obscuring the cavity can be a variety of materials, such as a type of broom material that can allow air to pass therethrough while also helping to insulate the cavity by helping to contain heated air within the cavity, or a type of screen material that can allow air to pass therethrough while also helping to insulate the cavity by helping to contain heated air within the cavity. If the bottom is semi-open, the material at least partially obscuring the bottom can be configured to be a passive element that a user of the fuel dispensing device need not manipulate, e.g., remove, open, etc., in order to handle the nozzle and dispense fluid therefrom.

Figure 27:
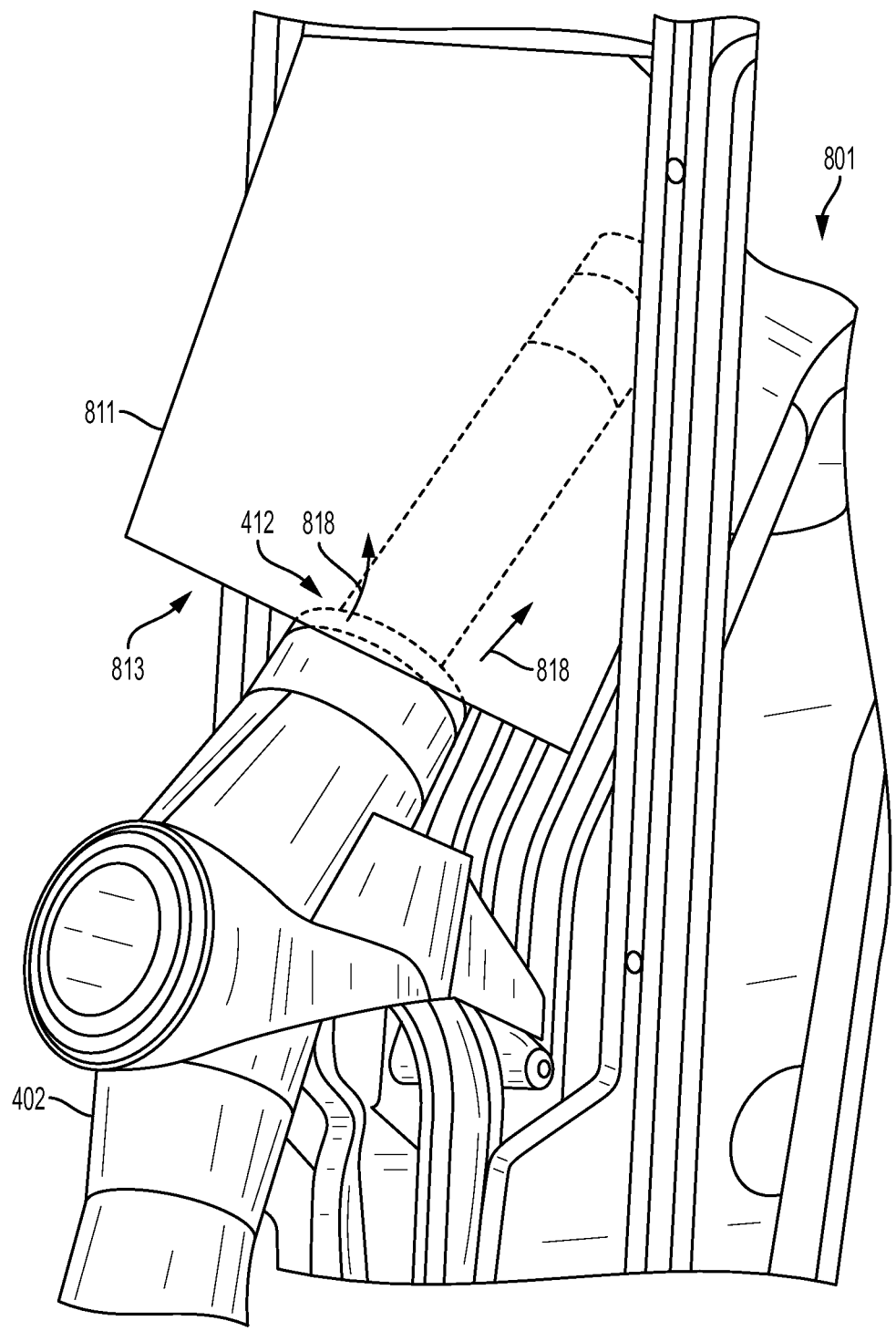
FIG. 27 is a perspective view of an embodiment of a fuel dispensing device including an air containment mechanism.

FIG. 27 illustrates an embodiment of a fuel dispensing device 801 configured to heat fluid that can be dispensed therefrom. The fuel dispensing device 801 is the same as the device 401 of FIGS. 16-20 except that the device 801 of FIG. 27 includes an air containment mechanism configured to facilitate heating of the fuel dispensing device's nozzle 402 using heated air that exits the nozzle 402 through the air exit opening 412, as shown by air exit arrows 818. The air containment mechanism in this illustrated embodiment is located at a portion of a fuel dispensing device's housing that seats the nozzle and includes a cavity 813 defined by the nozzle boot 403 and a cover 811 such that the cavity 813 has closed walls except for an open bottom through which the nozzle 402 can extend when seated in the boot 403. The air containment mechanism can thus be configured to help contain the heated air that exits the air exit opening 412 in proximity to the nozzle 402 and in particular in proximity to a distal portion thereof including the fluid exit opening 410. The cover 811 in this illustrated embodiment includes a rectangular plate, but the cover 811 can have other shapes and sizes in accordance with, e.g., size and shape of the nozzle, size and shape of the nozzle boot, location of the air exit opening, etc.

In some embodiments, a sensor configured to sense ambient temperature can be disposed within the cavity 813, e.g., attached to the cover 811, attached to a wall of the fuel dispensing device 801 within the nozzle boot 803, etc. The sensed temperature can be used to help control heating, as discussed above.

Figure 28:
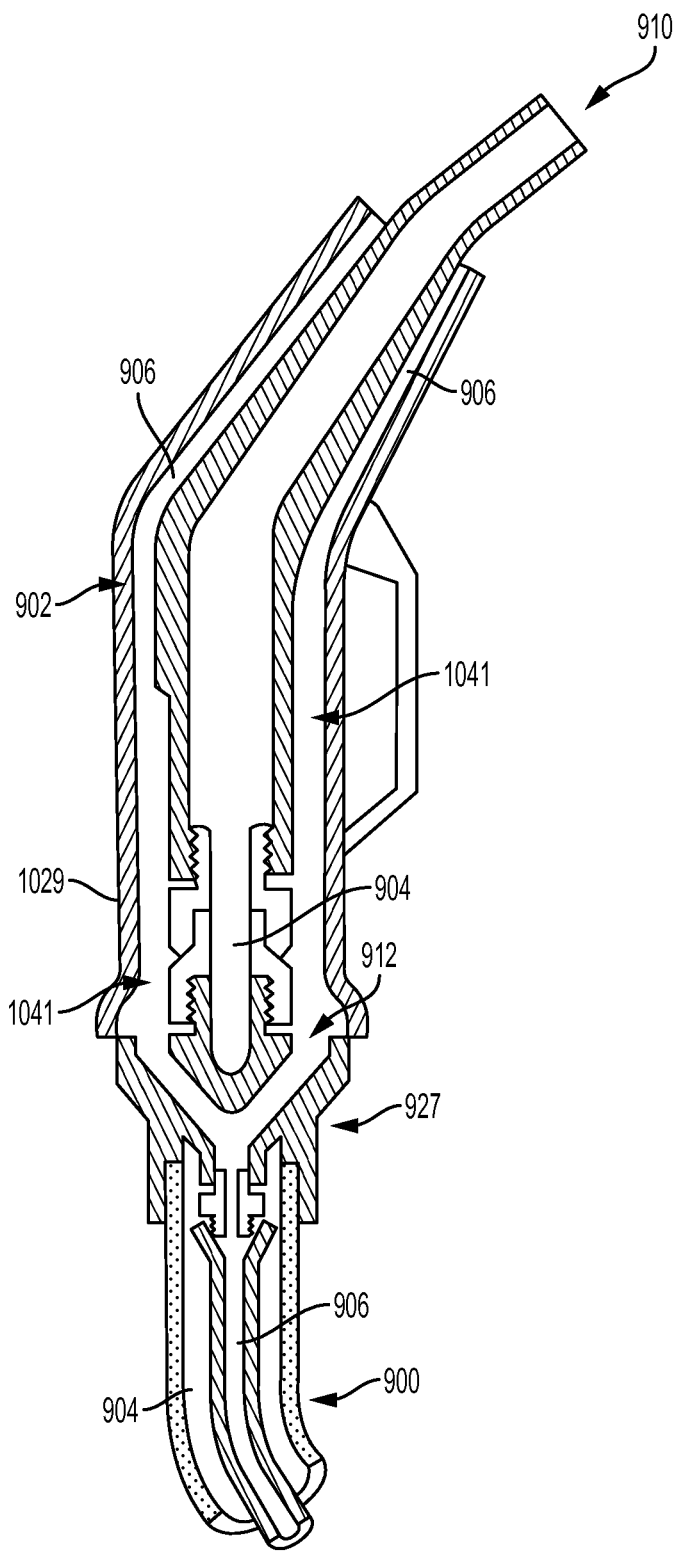
FIG. 28 is a schematic cross-sectional view of the fuel dispensing device of FIG. 26 including an air containment mechanism.
Figure 29:
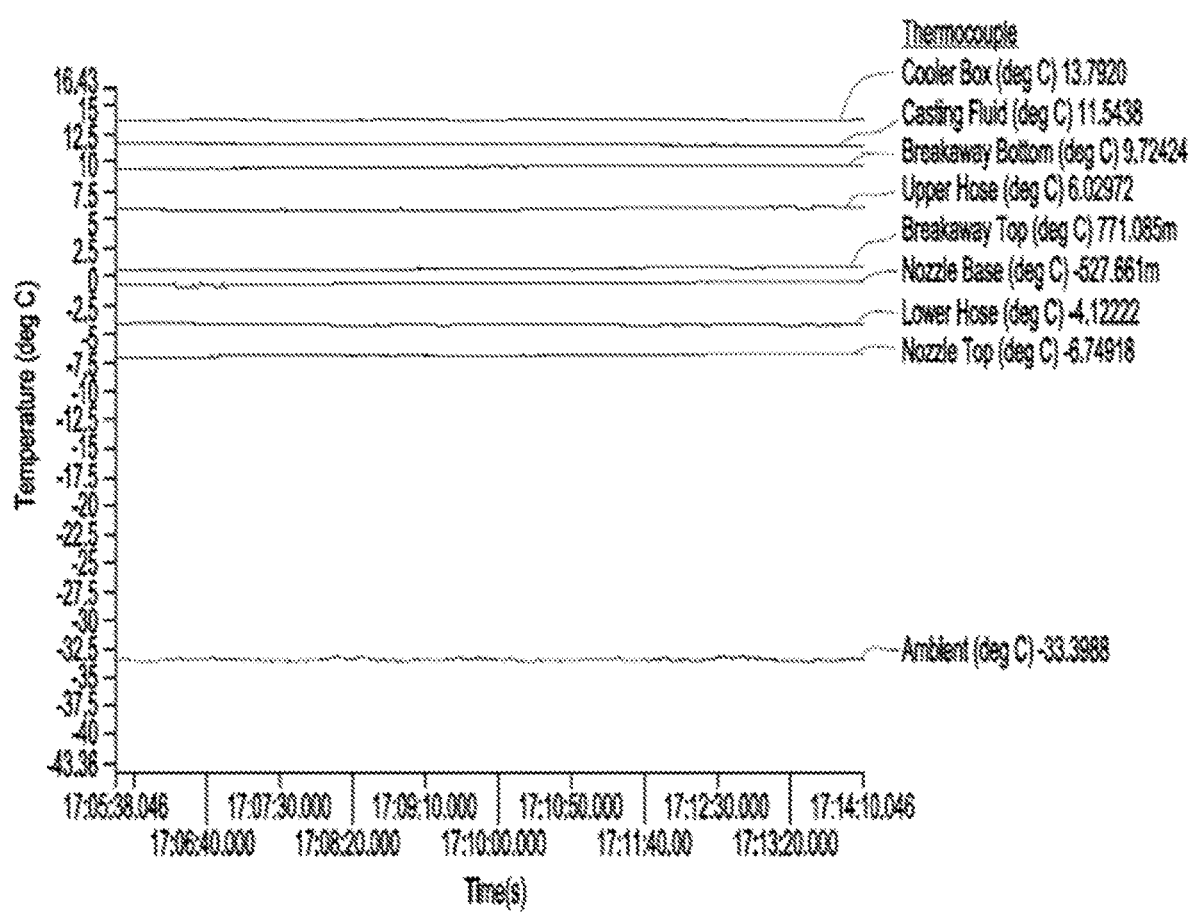
FIG. 29 is a graph showing temperature versus time for a test of an embodiment of a fuel dispensing device including a 220 W heat cable having air supplied thereto from a compressor.

FIG. 28 illustrates an embodiment of a fuel dispensing device configured to heat fluid 1004 that can be dispensed therefrom. The fuel dispensing device is the same as the device of FIG. 26 except that the device of FIG. 28 includes an air containment mechanism 1029 configured to facilitate heating of the fuel dispensing device's nozzle 902 using heated air that exits the air exit opening 912 into a gap of space 1041 defined between the nozzle 902 and the air containment mechanism 1029 and between the air diverter 927 and the air containment mechanism 1029. The air containment mechanism 1029 can be configured to help contain heated air that exits the hose 900 around an exterior of the nozzle 902 in an embodiment in which heated air is directed distally. In an embodiment in which heated air is directed proximally into the hose 900, the air containment mechanism 1029 can be configured to help direct the heated air around an exterior of the nozzle 902.

The air containment mechanism 1029 can be disposed around at least a portion of the nozzle 902, e.g., a proximal portion, to facilitate heating of the nozzle 902. As in this illustrated embodiment, the air containment mechanism 1029 can be located entirely proximally to the fluid exit opening 910, e.g., entirely proximally to a distal end of the nozzle's spout. Such placement can help avoid the air containment mechanism 1029 from getting in the way of the fluid 904 being dispensed from the nozzle 902 while helping to heat the nozzle 902 with heated air.

The air containment mechanism 1029 can be in fluid communication with the air diverter 927, thereby allowing the air 906 to pass freely between the air diverter 927 and the air containment mechanism 1029.

The air containment mechanism 1029 can be configured to be removably and replaceably coupled to the fuel dispensing device, such as by being configured to clamp thereon and unclamp therefrom, by being configured to be snap fit onto and off from the nozzle 902, etc. The air containment mechanism 1029 being removable and replaceable can facilitate retrofitting the air containment mechanism 1029 to existing nozzles and/or can facilitate repair, cleaning, etc. of the nozzle 902. In other embodiments, the air containment mechanism 1029 can be non-removably attached to the fuel dispensing device, such as by being integrally formed with the fuel dispensing device, by being welded thereto, etc.

The air containment mechanism 1029 has a generally cylindrical shape in this illustrated embodiment so as to correspond to the generally cylindrical outer shape of this illustrated embodiment's nozzle 902, but the air containment mechanism 1029 can have other shapes.

In some embodiments, a fuel dispensing device can be configured to heat a nozzle of the fuel dispensing device using heated air released from the fuel dispensing device through an air exit opening located within or adjacent to a nozzle boot of the fuel dispensing device. The air exit opening can be oriented in a direction toward the nozzle boot to help direct the heated air toward the nozzle boot and, thus, toward the nozzle when the nozzle is seated in the nozzle boot. The heated air that exits the air exit opening can thus be configured to heat the nozzle boot and to heat the nozzle when the nozzle is seated in the nozzle boot. In some embodiments, the nozzle can include the air exit opening located adjacent to a nozzle boot of the fuel dispensing device, such as in the embodiment of the nozzle 102 of FIG. 1 that includes the air exit opening 112, in the embodiment of the nozzle 402 of FIGS. 17 and 27 that includes the air exit opening 412, in the embodiment of the nozzle 502 of FIG. 21 that includes the air exit opening 512, in the embodiment of the nozzle 702 of FIG. 24 that includes the air exit opening 712, and in the embodiment of the nozzle 902 of FIGS. 26 and 28 that includes the air exit opening 912. In some embodiments, the fuel dispensing device can include a conduit disposed within the fuel dispensing device, e.g., within a housing thereof, that can include the air exit opening located adjacent to a nozzle boot of the fuel dispensing device. The heated air that flows through the conduit can include ambient air from within the housing that has already been heated within the housing, such that the conduit can be configured to redirect the heated air toward the nozzle.

Figure 30:
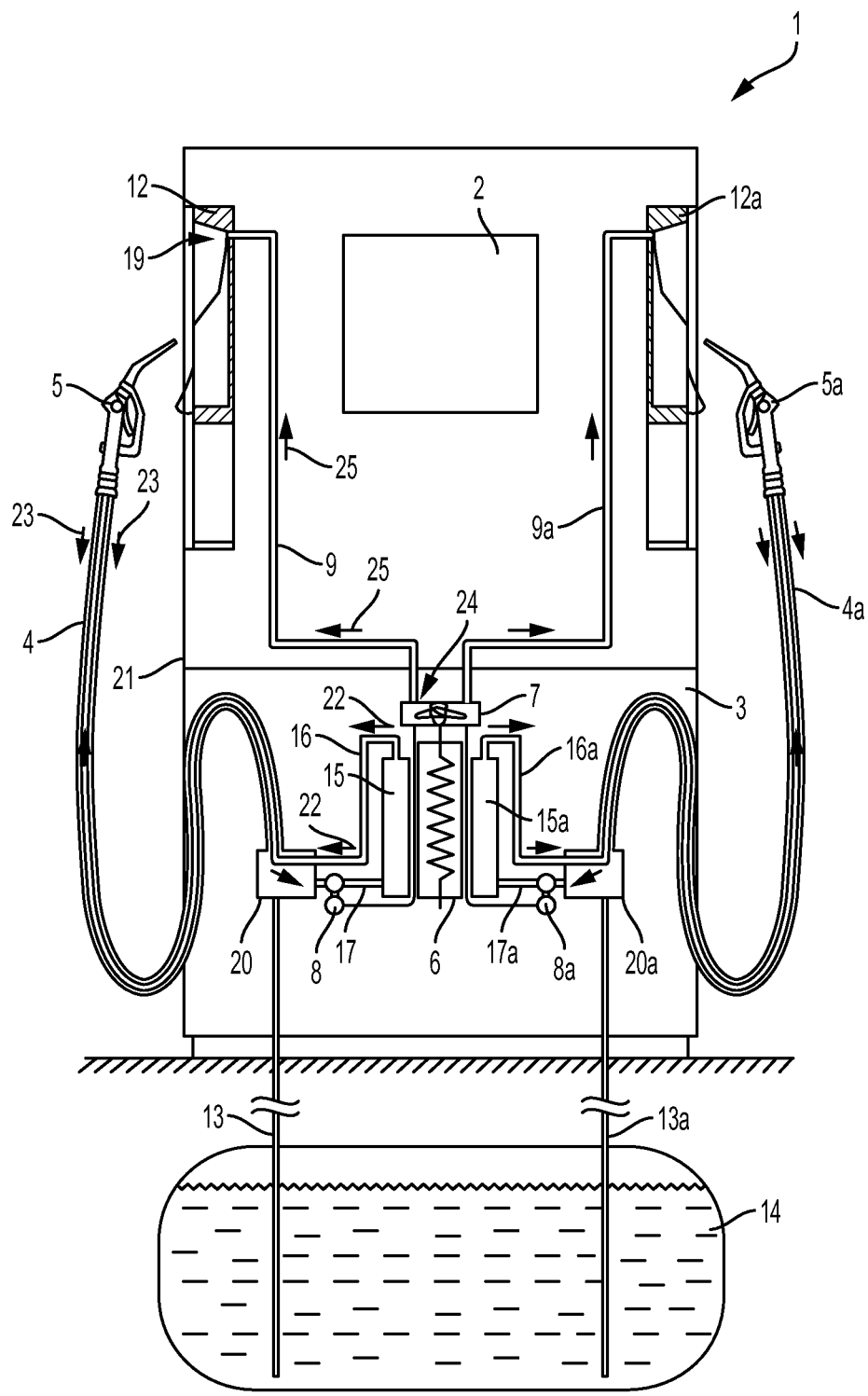
FIG. 30 is a schematic view of one embodiment of a fuel dispensing device including a heating system.

FIG. 30 illustrates an embodiment of a fuel dispensing device 1 including a first conduit 9 disposed within the fuel dispensing device 1 and having an air exit opening 19 located adjacent to a nozzle boot 12 of the fuel dispensing device 1. The device 1 can include a hose 4, a nozzle 5, a fluid supply 14, and a fluid meter 20. The device 1 can also include a housing 21 generally divided into an electronics compartment 2 and a hydraulics compartment 3.

The fluid supply 14 in this illustrated embodiment is in the form of a reservoir configured to be located underground. The fluid, e.g., the fuel, in the fluid supply 14 can be configured to be advanced into the hose 4 from the fluid supply 14 through a fluid line 13 that extends to the fluid meter 20.

The hose 4 in this illustrated embodiment is configured to circulate the fuel therein, which can facilitate heating of the fuel. In general, the fuel can be circulated within the hose 4 using a circulation system while allowing the fuel 4 to be dispensed on demand from the nozzle 5. Exemplary embodiments of circulation systems configured to circulate fluid within a fluid dispensing device's hose are further described in WO 2011/054400 entitled "Fluid Dispensing Unit Having A Circulation System And A Method For Circulating A Fluid In A Fluid Dispensing Unit" filed Nov. 9, 2009, which is incorporated by reference herein in its entirety.

As in this illustrated embodiment, the circulation system can include a heating element 6, an inner fluid reservoir 15 in communication with (e.g., directly connected thereto or located in close proximity of) the heating element 6, a first fluid duct 16 extending from the inner fluid reservoir 15 to and coaxially through the hose 4, a second fluid duct 17 extending between the hose 4 and the inner fluid reservoir 15, and a motor 8 configured to drive the fuel to facilitate the fuel circulation. The fuel can be configured to circulate from the inner fluid reservoir 14, through the first fluid duct 16, out of the distal opening of the first fluid duct 16 and back to the inner fluid reservoir 14 through the hose 4 and the second fluid duct 17. The first fluid duct 16 can have a distal opening (not shown), e.g., a fluid exit opening, in the fluid hose 4 that is located proximal to the nozzle 5. The fuel dispensing device 1 can include a valve (not shown) configured to control when the fuel flows through the distal opening or recirculates in the hose 4. Electronics (e.g., a controller, a microprocessor, a CPU, etc.) contained in the electronics compartment 2 can be configured to control the opening and closing of the valve.

As shown in this illustrated embodiment, the hose 4 can include coaxial passageways therein to facilitate the heating of the fuel. In this illustrated embodiment, the fuel can circulate in a direction from the inner fluid reservoir 15 toward the nozzle 5 in an inner one of the coaxial passageways, as shown by first circulation arrows 22, and can circulate in a direction toward the inner fluid reservoir 15 in an outer one of the coaxial passageways, as shown by first circulation arrows 23.

The fuel can be circulated within the hose 4 when the fuel dispensing device 1 is not in use, e.g., when the nozzle 5 is seated in the nozzle boot 12 and does not have fuel being dispensed therefrom. The circulating system can thus help prevent stationary fuel remaining within the hose 4 and/or the nozzle 5 from freezing.

The fuel dispensing device 1 can include one or more temperature sensors (not shown) configured to sense a temperature of the fluid in the hose 4, a temperature of the fluid in the nozzle 5, an ambient temperature within the housing 21 (e.g., within the hydraulics compartment 3), and/or an ambient outdoor temperature outside the housing 21. The sensed temperature can be used, e.g., by electronics (e.g., a controller, a microprocessor, a CPU, etc.) contained in the electronics compartment 2, to control the starting and stopping of the fuel's circulation in the hose 4. For example, if the sensed temperature is greater than a predetermined threshold temperature, e.g., the temperature at which the fuel can begin to crystallize, the circulation can be off, and if the sensed temperature is less than the predetermined threshold temperature, the circulation can be on.

The sensed temperature can be used, e.g., by the electronics in the electronics compartment 2, to control an amount of heat provided by the heating element 6, thereby controlling how much the fuel is heated. For example, if the sensed temperature is within a first predetermined range of temperatures, the heating element 6 can provide a first level of heat, and if the sensed temperature is within a second predetermined range of temperatures that are lower than the first predetermined range, the heating element 6 can provide a second level of heat that is greater than the first level of heat.

The sensed temperature can be used, e.g., by the electronics in the electronics compartment 2, to control a flow rate of the circulated fuel in the hose 4, e.g., by controlling a power output of the motor 8. The fuel dispensing unit 1 can include a proportional valve (not shown) configured to facilitate control of the flow rate. In general, the higher the motor's power output, the higher the fuel's flow rate within the hose 4 and the more heated the fuel. For example, if the sensed temperature is greater than a predetermined threshold temperature, the motor 8 can provide a first amount of power output, and if the sensed temperature is below the predetermined threshold temperature, the motor 8 can provide a second amount of power output that is greater than the first amount of power output.

The heating element 6, the motor 8, and a fan 7 can be configured to cooperate to provide and transport heated air through the first conduit 9 and out the air exit opening 19. In this illustrated embodiment the fan 7 and the motor 8 are separate, independent elements, but the fan 7 and the motor 8 can be part of a single unit providing both fan and motor functions. The first conduit 9 includes a rigid elongate tube in this illustrated embodiment, but the first conduit 9 can have other configurations, such as a flexible elongate tube. In general, the first conduit 9 can be configured to pass heated air from within the housing 21 to the nozzle boot 12 in a direction of conduit arrows 25, thereby facilitating the heating of the nozzle 5 when the nozzle 5 is seated in the nozzle boot 5. The first conduit 9 can be cannulated, with the heated air passing through the cannulated interior of the first conduit, e.g., through an inner lumen thereof. The fuel dispensing device 1 can include an air containment mechanism (not shown), as discussed herein, configured to facilitate heating of the nozzle 5 using heated air that enters the nozzle boot 12.

A proximal end of the first conduit 9 can be in communication with the heating element 6 such that air adjacent to the heating element 6 can pass into the first conduit 9 through a proximal opening 24 of the first conduit 9. A distal end of the first conduit 9 can be in communication with the nozzle boot 12 such that air can exit the first conduit 9 and enter the nozzle boot 12 through the first conduit's air exit opening 19.

The heated air passing through the first conduit 9 can be ambient air from within the housing 21, e.g., from within the hydraulics compartment 3. In this way, a separate air supply need not be provided. The heating element 6 can be located upstream of the fan 7, as in this illustrated embodiment, such that air drawn by the fan 7 into the first conduit 9 has been in proximity of the heating element 6 so as to have been heated by the heating element 6 before being drawn into the first conduit 9. In this way, as mentioned above, heated air can enter the first conduit 9 through the proximal opening thereof that is in communication with the heating element 6.

The motor 8 can be configured to drive the fan 7. The motor 8 can thus be configured to drive the circulation of the fuel through the hose 4 and to drive the flow of heated air through the first conduit 9.

Similar to that discussed above regarding the circulation of fuel in the hose 4, a sensed temperature can be used to control the starting and stopping of the heated air's passing into the first conduit 9 (e.g., by starting and stopping the fan 7); can be used to control an amount of heat provided by the heating element 6, thereby controlling how much the air in the first conduit 9 is heated; and/or can be used to control a flow rate of the heated air within the first conduit 9 (e.g., by controlling a rotation speed of the fan 7).

The fuel dispensing device 1 in this illustrated embodiment includes a second hose 4a that can be configured to circulate fuel therein similar to the hose 4, and includes another first conduit 9a that can be configured to heat a second nozzle boot 12a similar to the first conduit 9. The fuel dispensing device 1 can thus include a second motor 8a, a second fuel line 13a, a second inner fluid reservoir 15a, another first fluid duct 16a, another second fluid duct 17a, and a second fluid meter 20a. The heating element 6 and the fan 7 can be configured to facilitate the heating of both nozzle boots 12, 12a and both hoses 4, 4a.

Figure 31:
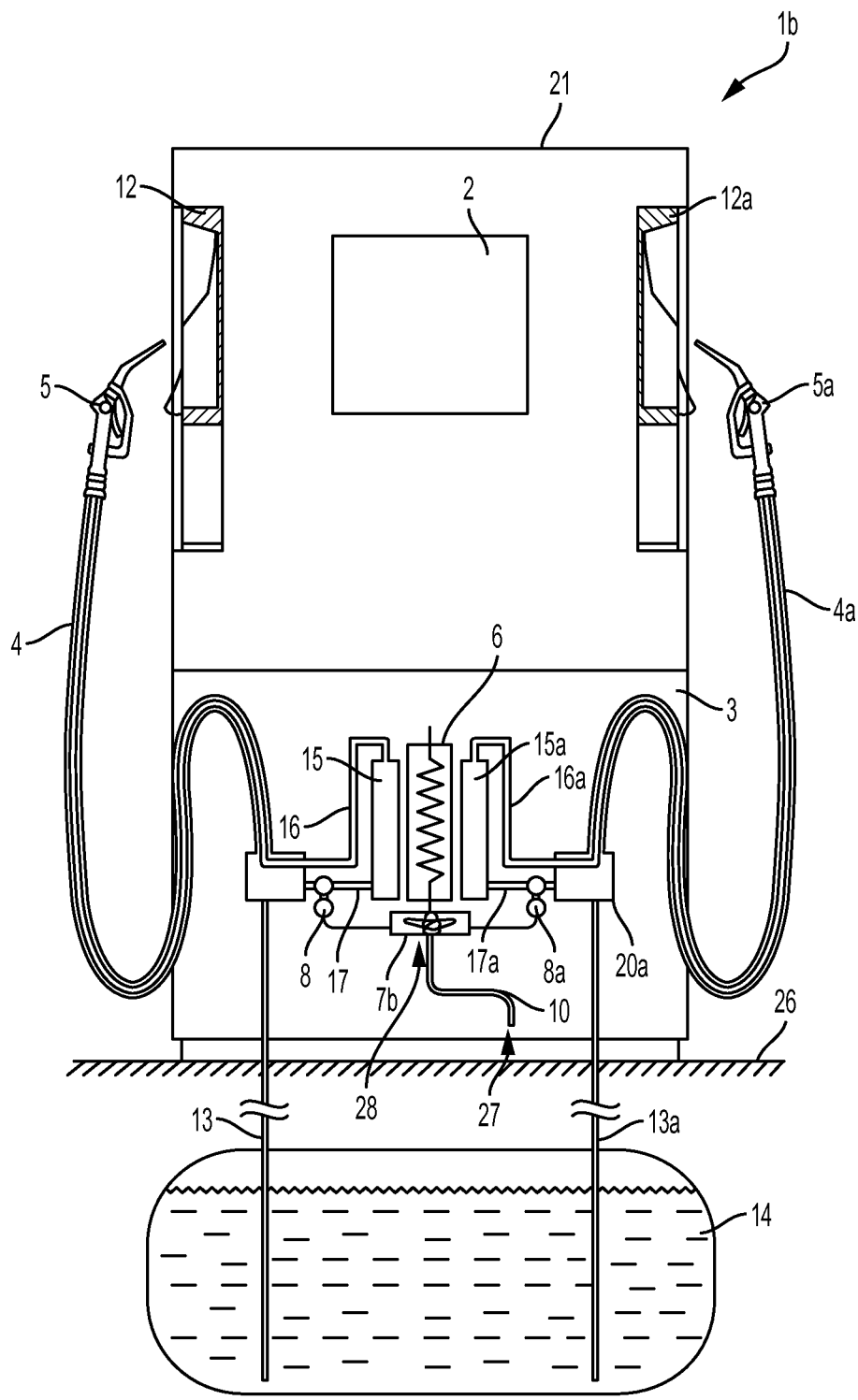
FIG. 31 is a schematic view of another embodiment of a fuel dispensing device including a heating system.

In some embodiments, a fuel dispensing device can be configured to heat a housing thereof, e.g., heat an interior of the housing. FIG. 31 illustrates an embodiment of a fuel dispensing device 1b configured to heat a housing 21 thereof. The fuel dispensing device 1b of FIG. 31 is similar to the fuel dispensing device 1 of FIG. 30 and has like-named and like-numbered components accordingly. Unlike the embodiment illustrated in FIG. 30 in which the fan 7 is located above the heating element 6, e.g., located closer to a top of the hydraulics compartment 3, the embodiment of FIG. 31 includes a fan 7b located below the heating element 6, e.g., closer to the 26, and the embodiment of FIG. 31 includes a second conduit 10.

In general, the second conduit 10 can be configured to facilitate the heating of the housing 21 by passing heated air therethrough and out a distal opening 27 thereof that is located within the housing 21, e.g., within the hydraulics compartment 3 of the housing 21. A proximal end of the second conduit 10 can be in communication with the heating element 6 such that air adjacent to the heating element 6 can pass into the second conduit 10 through a proximal opening 28 of the second conduit 10. The distal opening 27 can be located adjacent to and can be directed toward a bottom of the housing 21, e.g., a bottom of the hydraulics compartment 3. In this way, heated air exiting the second conduit 10 can rise upwards, thereby facilitating efficient heating of the housing's interior, e.g., the hydraulics compartment's interior.

The heated air passing through the second conduit 10 can be ambient air from within the housing 21, e.g., from within the hydraulics compartment 3. In this way, a separate air supply need not be provided. The heating element 6 can be located upstream of the fan 7b, as in this illustrated embodiment, such that air drawn by the fan 7b into the second conduit 10 has been in proximity of the heating element 6 so as to have been heated by the heating element 6 before being drawn into the second conduit 10. In this way, heated air can enter the second conduit 10 through the proximal opening 28 thereof that is in communication with the heating element 6.

The motor 8 can be configured to drive the fan 7b. The motor 8 can thus be configured to drive the circulation of the fuel through the hose 4 and to drive the flow of heated air through the second conduit 10.

Similar to that discussed above regarding the circulation of fuel in the hose 4, a sensed temperature can be used to control the starting and stopping of the heated air's passing into the second conduit 10 (e.g., by starting and stopping the fan 7b); can be used to control an amount of heat provided by the heating element 6, thereby controlling how much the air in the second conduit 10 is heated; and/or can be used to control a flow rate of the heated air within the second conduit 10 (e.g., by controlling a rotation speed of the fan 7b).

Figure 32:
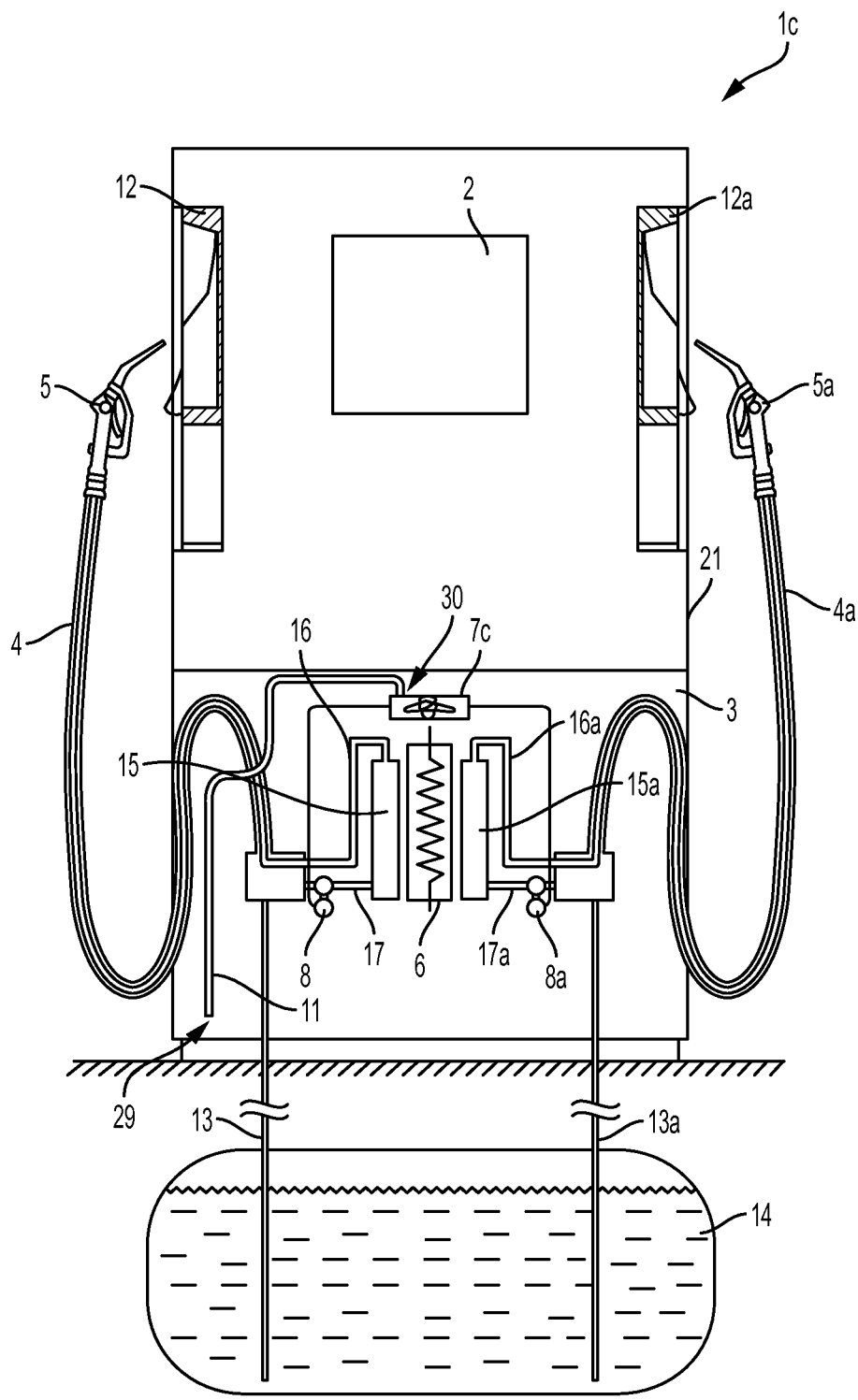
FIG. 32 is a schematic view of yet another embodiment of a fuel dispensing device including a heating system.

FIG. 32 illustrates another embodiment of a fuel dispensing device 1c configured to heat a housing 21 thereof. The fuel dispensing device 1c of FIG. 32 is similar to the fuel dispensing device 1 of FIG. 30 and has like-named and like-numbered components accordingly. In this illustrated embodiment, the fuel dispensing device 1c includes a third conduit 11 that, in general, can be configured to facilitate the heating of the housing 21 by passing heated air therethrough and out a distal opening 29 thereof that is located within the housing 21, e.g., within the hydraulics compartment 3 of the housing 21. A proximal end of the third conduit 11 can be in communication with the heating element 6 such that air adjacent to the heating element 6 can pass into the third conduit 11 through a proximal opening 30 of the third conduit 11. The distal opening 29 can be located adjacent to and can be directed toward a top of the housing 21, e.g., a top of the hydraulics compartment 3. In this way, since heated air tends to rise, air that has risen to the top of the housing 21, e.g., at the top of the hydraulics compartment 3, can be directed from top to bottom, thereby facilitating efficient heating of the housing's interior, e.g., the hydraulics compartment's interior.

The heated air passing through the third conduit 11 can be ambient air from within the housing 21, e.g., from within the hydraulics compartment 3. In this way, a separate air supply need not be provided. The heating element 6 can be located upstream of the fan 7c, as in this illustrated embodiment, such that air drawn by the fan 7c into the third conduit 11 has been in proximity of the heating element 6 so as to have been heated by the heating element 6 before being drawn into the third conduit 11. In this way, heated air can enter the third conduit 11 through the proximal opening 30 thereof that is in communication with the heating element 6.

The motor 8 can be configured to drive the fan 7c. The motor 8 can thus be configured to drive the circulation of the fuel through the hose 4 and to drive the flow of heated air through the third conduit 11.

Similar to that discussed above regarding the circulation of fuel in the hose 4, a sensed temperature can be used to control the starting and stopping of the heated air's passing into the third conduit 11 (e.g., by starting and stopping the fan 7c); can be used to control an amount of heat provided by the heating element 6, thereby controlling how much the air in the third conduit 11 is heated; and/or can be used to control a flow rate of the heated air within the third conduit 11 (e.g., by controlling a rotation speed of the fan 7c).

A fuel dispensing device, e.g., any of the fuel dispensing devices described with respect to FIGS. 1-32, can include any one of more of first, second, and third conduits configured similar to the first, second, and third conduits 9, 10, 11 of FIGS. 30-32, respectively. A fuel dispensing device that includes at least two of the first, second, and third conduits can be configured to efficiently protect against fluid freezing at least because a plurality of the same components (e.g., the same heating elements and the same fan) can be used to provide heating via the two or more conduits and/or the same temperature sensor readings can be used to simultaneously control heating via the multiple conduits (e.g., the starting and the stopping of the fan can simultaneously start and stop air flow through multiple conduits, the speeding up or slowing down of the fan can simultaneously change flow rates in multiple conduits, the changing of the heating element's heat level can simultaneously change how hot heated air is within each of multiple conduits, etc.). Similarly, a fuel dispensing device that includes at least one of the first, second, and third conduits and includes a circulating system configured to circulate fluid through a hose of the fuel dispensing device can be configured to efficiently protect against fluid freezing at least because a plurality of the same components can be used to provide heating via the conduit(s) and the hose and/or the same temperature sensor readings can be used to simultaneously control heating via the conduit(s) and the hose.

In some embodiments, a fluid dispensing device can include a heating element configured to directly heat fluid that can be dispensed from the fluid dispensing device. The heating element can be at least partially disposed within each of a nozzle and a hose of the fluid dispensing device, thereby allowing the fluid to be heated in both the nozzle and the hose. The heating element can be configured to heat the fluid without heated air flowing through the hose and/or the nozzle, such as in the embodiments including heated air flow described with respect to FIGS. 1, 16, 21, 24, 26-28, and 30-32. The fluid dispensing device can thus be less expensive and/or less complicated to manufacture because it need not include an air flow system that facilitates air flow through the hose and/or nozzle. The heating element can be configured to be retrofitted into existing nozzles and hoses, which can allow for flexibility of use and/or can reduce costs (e.g., by not requiring purchase of a new fluid dispensing device to provide for fluid heating).

Figure 33:
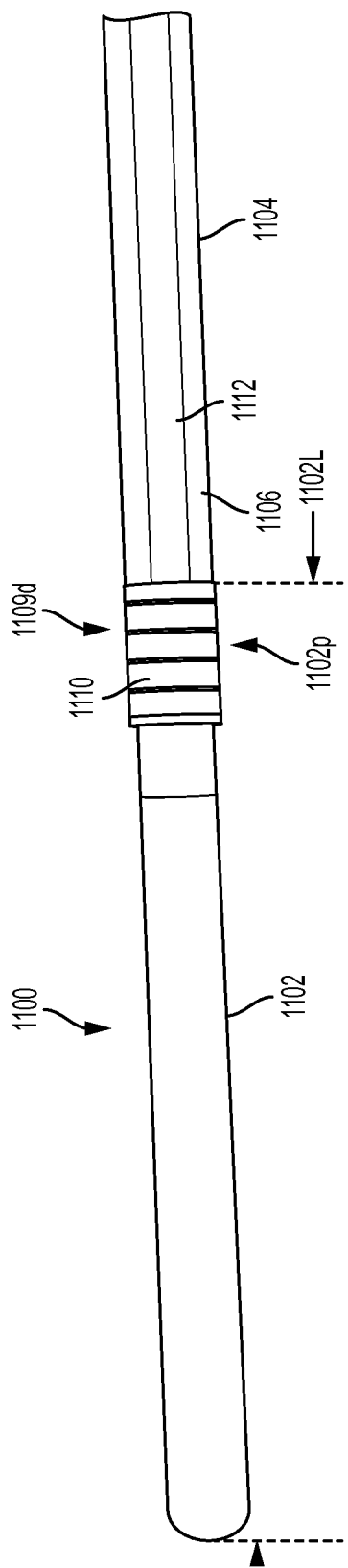
FIG. 33 is a side view of one embodiment of a heating assembly including an outer extension tube, a heating element, and an outer tube.

FIG. 33 illustrates an embodiment of a heating assembly 1100 configured to be included in a fluid dispensing device and to heat fluid dispensable therefrom. The heating assembly 1100 has a proximal portion that is configured to be disposed in a hose of the fluid dispensing system and a distal portion that is configured to be disposed in a nozzle coupled to a distal end of the hose, as discussed further below. Such a configuration allows the heating assembly 1100 to heat fluid within both the hose and the nozzle. The heating assembly 1100 can be configured to be fully contained within the hose and the nozzle, which can help efficiently direct the heat provided by the heating assembly 1100 to the fluid within the hose and the nozzle and/or can help prevent the heating assembly 1100 from being damaged or tampered with when installed in a fluid dispensing device.

The heating assembly 1100 can have a variety of sizes, shapes, and configurations. In the illustrated embodiment, the heating assembly 1100 includes a conductive outer extension tube 1102, an outer tube 1104 having a distal end 1104*d* attached to a proximal end 1102*p* of the outer extension tube 1102, and a heating element 1106 extending at least partially through each of the outer extension tube 1102 and the outer tube 1104, e.g., a distal portion thereof disposed within the outer extension tube 1102 and a proximal portion thereof disposed within the outer tube 1104.

The outer extension tube 1102 can have a variety of sizes, shapes, and configurations and can be formed from a variety of conductive materials, such as one or more conductive metals or a conductive polymer. In an exemplary embodiment, the outer extension tube 1102 is a rigid member formed from a rigid material. The rigidity of the outer extension tube 1102 can facilitate secure positioning of the outer extension tube 1102 within a nozzle. In the illustrated embodiment, the outer extension tube 1102 is formed from stainless steel but can be formed from other materials in other embodiments.

A longitudinal length 1102L of the outer extension tube 1102 can vary. In general, and as discussed further below, the outer extension tube's longitudinal length 1102L may differ based on the size of the nozzle to which the heating assembly 1100 is to be coupled. For example, the outer extension tube's longitudinal length 1102L can be relatively short when used with a nozzle having a relatively shallow proximal portion in which the outer extension tube 1102 is disposed, and the outer extension tube's longitudinal length 1102L can be relatively long when used with a nozzle having a relatively deep proximal portion in which the outer extension tube 1102 is disposed. The longitudinal length 1102L can thus be customized for use with a particular nozzle to help heat as much fluid as possible within the nozzle.

The outer extension tube 1102 can include a well 1108 formed therein (see FIGS. 36 and 37, discussed further below). The well 1108 can be formed in the proximal end 1102*p* of the outer extension tube 1102 and it can extend therefrom along at least a partial longitudinal length of the outer extension tube 1102. The well 1108 can be configured to seat a distal end of the heating element 1106 therein, as shown in FIG. 33. The heating element's distal end can thus be configured to be disposed within a nozzle in which the outer extension tube 1102 is disposed. The well 1108 can have a closed distal end so as to extend along a partial portion of the outer extension tube's longitudinal length 1102L.

The proximal end 1102*p* of the outer extension tube 1102 can include a mating feature 1110 configured to mate to the distal end 1104*d* of the outer tube 1104. The mating feature 1110 can have a variety of sizes, shapes, and configurations. The mating feature 1100 can, as in this illustrated embodiment, include a recessed portion configured to seat the outer tube 1104 therein. The recessed portion can include ribs thereon, as shown, which can help mate the outer extension tube 1102 to the outer tube using an interference fit. Adhesive can be used in addition or as an alternative to the mating feature 1110 to help mate the outer tube 1104 and the outer extension tube 1102 together. Other examples of mating features include a protrusion configured to mate with a corresponding depression, a depression configured to mate with a corresponding protrusion, a snap fit member, threads, etc.

The outer tube 1104 can also have a variety of sizes, shapes, and configurations and can be formed from a variety of materials. In an exemplary embodiment, the outer tube 1104 is thermally conductive, e.g., allows heat from the heating element 1106 therein to pass therethrough, and is a flexible member formed from flexible materials. The flexibility of the outer tube 1104 can facilitate user manipulation of a hose in which the outer tube 1104 is disposed. In this illustrated embodiment, the outer extension tube 1102 is formed from Teflon® but can be formed from other materials in other embodiments.

Figure 34:
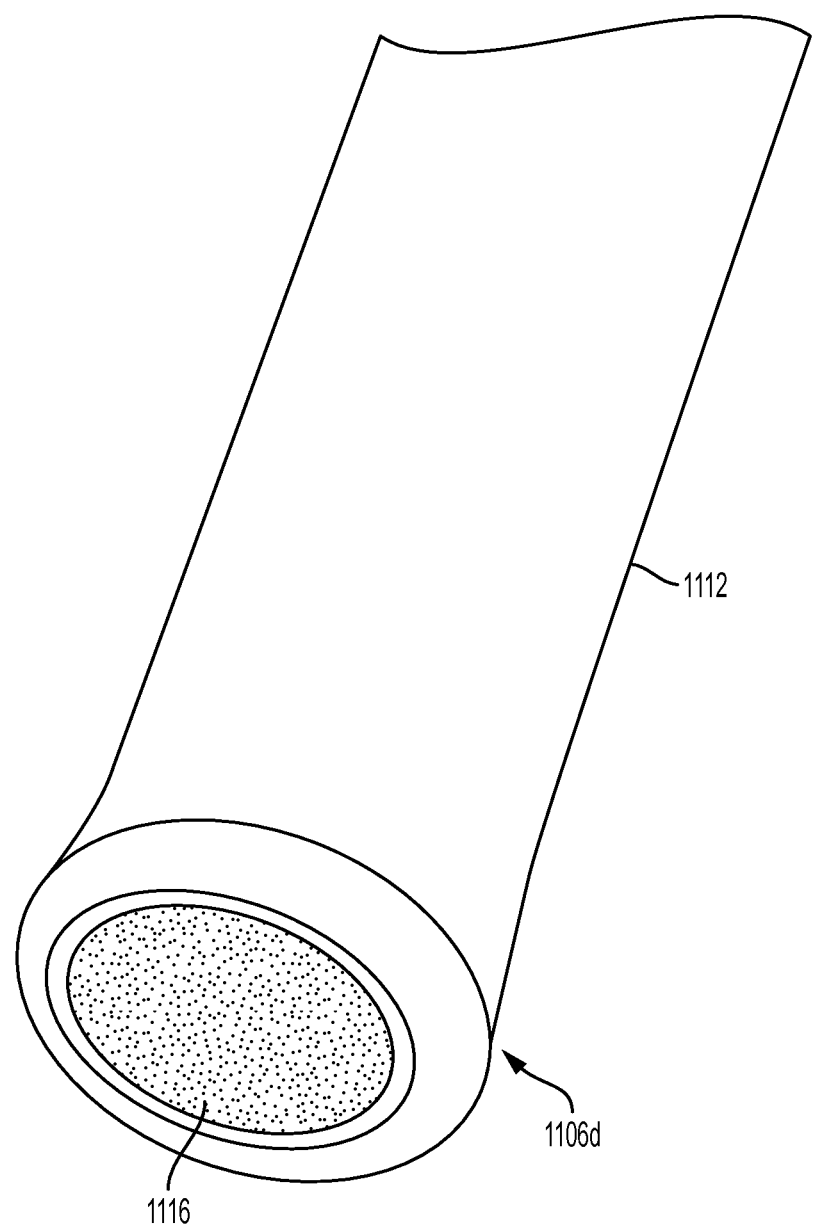
FIG. 34 is a perspective view of the heating element of FIG. 33 having a stopper disposed in an end thereof.
Figure 35:
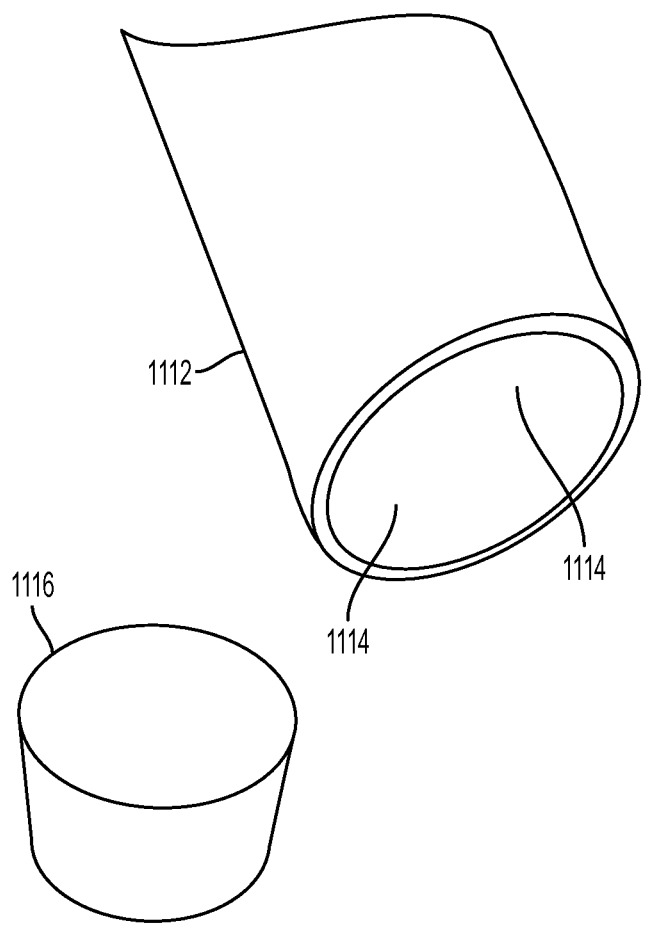
FIG. 35 is a perspective view of the heating element and the stopper of FIG. 34 with the stopper outside the heating element.

The heating element 1106 can be configured similar to other heating elements discussed herein, e.g., it can include a PTC heater or a heat cable. As shown in FIGS. 33-35, the heating element 1106 includes a non-conductive tube 1112, also referred to herein as a "jacket," having one or more electrical leads 1114 extending longitudinally therethrough and configured to radiate heat. In the illustrated embodiment, the heating element 1106 includes two electrical leads 1114. The jacket 1112 can be a flexible member, which will allow both the jacket 1112 and a hose disposed therearound to flex during use. The jacket 1112 is formed from Teflon® in this illustrated embodiment, but the jacket 1112 can be formed from other flexible materials.

The heating element 1106 can, as shown in FIG. 34, have a sealed distal end 1106d. The sealed distal end 1106d can help prevent fluid surrounding the outer extension tube 1102 and the outer tube 1104 from coming into contact with the electrical leads 1114 within the jacket 1112 in the unlikely event that fluid passes into the outer extension tube 1102 or the outer tube 1104. The sealed distal end 1106d can thus act as a second line of defense to the tubes 1102, 1004 protecting the electrical leads 1114. The sealed distal end 1106d can be disposed within the well 1108, as in FIG. 33, which as mentioned above can be disposed within a nozzle. In an exemplary embodiment, the sealed distal end 1106d is positioned adjacent to the closed end of the well 1108 such that the heating element 1106 extends through an entire length of the well 1108.

The heating element's distal end 1106d can be sealed in a variety of ways. In the illustrated embodiment, the heating element's distal end 1106d is mechanically sealed using a non-conductive stopper 1116 disposed therein. The illustrated non-conductive stopper 1116 is rubber, but it can be formed from any number of other materials. The stopper 1116 can be configured to be disposed within the jacket 1112 to act as a barrier between the electrical leads 1114 and external fluid in the event of a leak.

As an additional or alternative measure of protection, the distal-most end of the jacket 1112 can be configured to be rolled or folded into itself and secured around the electrical leads 1114. The jacket's distal end can be temporarily heated to facilitate the rolling thereof around the leads 1114. The distal ends of the electrical leads 1114 (e.g., about 0.25 in. thereof) can be trimmed or otherwise removed, as shown in FIG. 35, such that the leads 1114 terminate at a location proximal to the distal folded end of the jacket. The folded or rolled end with thus act as an additional barrier, and it can also help provide room for the stopper 1116 to be secured within the distal end of the jacket 1112.

Figure 36:
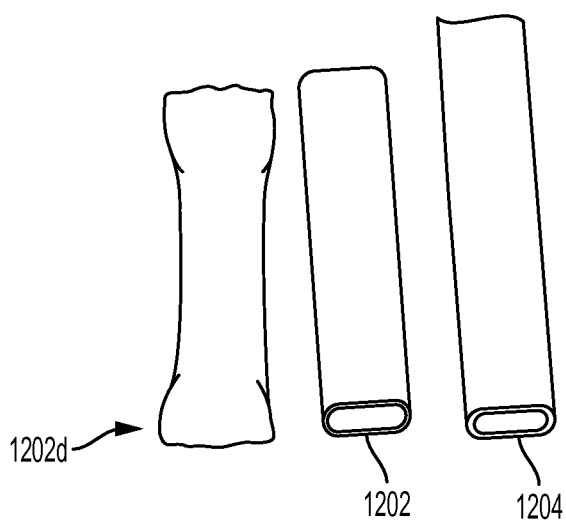
FIG. 36 is a perspective view of another embodiment of a heating element in assembled form (right), without electrical leads thereof (middle), and with sealed ends (left)

In another embodiment, as shown in FIG. 36, a heating element 1200 can include a jacket 1202 having a distal end 1202d that is ultrasonically welded to form a seal. The jacket's proximal end 1202p is similarly sealed in the illustrated embodiment, but the proximal end 1202p can be left open to facilitate connection of the heating element's electrical leads 1204 to a source of electrical power. FIG. 36 also shows the jacket 1202 as a standalone element (pre-seal) to the left of the sealed heating element 1200, and to the left of the standalone element, the jacket 1202 (pre-seal) having the electrical leads 1204 disposed therein.

Referring again to the embodiment of FIG. 33, the heating assembly 1110 can include a heat transfer element 1118, shown in FIGS. 37-40, configured to facilitate the transfer of heat from the heating element 1106 to outside the heating assembly 1100, e.g., to fluid outside the heating assembly 1100. In an exemplary embodiment, the heat transfer element 1118 can be disposed in a space 1120 (see FIG. 40) surrounding the heating element 1106 within the outer extension tube 1102, e.g., in a gap defined between an exterior surface of the heating element 1106 and an interior surface of the outer extension tube 1102, so as to be in surrounding relation to the heating element 1106. The heat transfer element 1118 can transfer heat better than air, e.g., transferring heat in a range of about 10° to 15° more than air, which can help the heating assembly 1100 better heat fluid of a fluid dispensing system, thereby allowing the fluid dispensing system to function better in cold environments.

The heat transfer element 1118 can have a variety of sizes, shapes, and configurations. In illustrated embodiment, the heat transfer element 1118 is a conductive member that is configured to seat the heating element 1106 therein. The conductive member can be made from a variety of conductive materials, as will be appreciated by a person skilled in the art, such as a metal (e.g., aluminum, copper, etc.) or a conductive polymer. The heat transfer element 1118 in the illustrated embodiment is made from aluminum. The heat transfer element 1118 is configured to seat the heating element 1106 in a hollowed interior 1118h extending longitudinally therealong, as shown in FIGS. 38 and 39. In an exemplary embodiment, the hollowed interior 1118h has an inner diameter that closely conforms to an outer diameter of the heating element 1106 such that the components are in direct contact with one another to facilitate the transfer of heat. In other embodiments, the heat transfer element can include or be in the form of a heat transfer epoxy or a heat transfer paste that is delivered into the well 1108 around the heating element 1106. The well 1108 can have a closed distal end, which can facilitate containment of the epoxy or the paste within the outer extension tube 1102.

Figure 40:
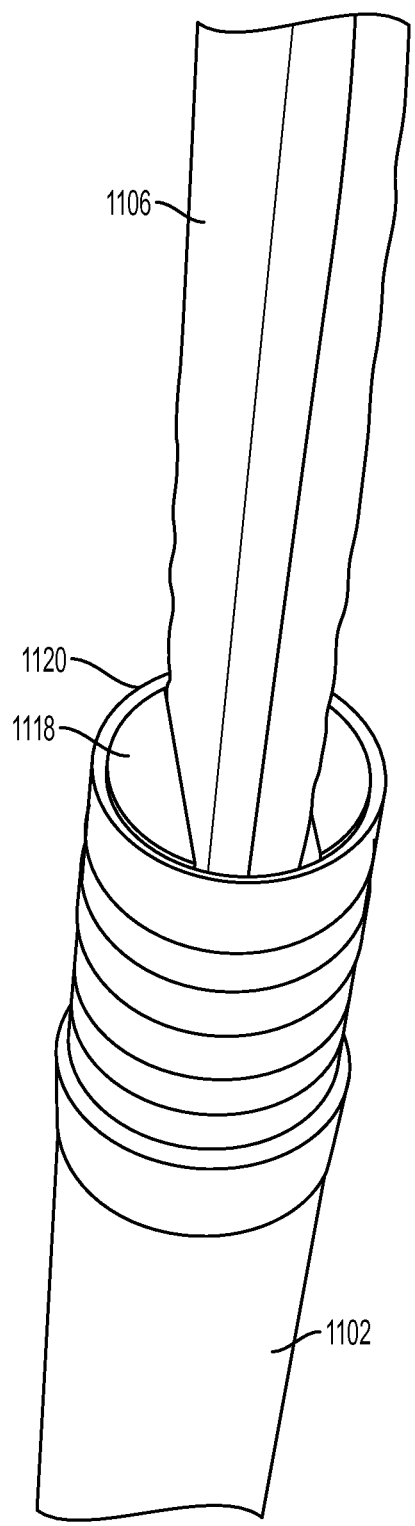
FIG. 40 is a perspective view of the heating element, the outer extension tube, and the heat transfer element of FIG. 39 assembled together.

The outer extension tube 1102, e.g., the well 1108 thereof, can be configured to seat an entirety of the heat transfer element 1118 therein, as shown in FIG. 40. The heat transfer element 1108 can thus be configured to facilitate transfer of heat from the heating element 1106 through the outer extension tube 1102 to the environment surrounding the outer extension tube 1102 where fluid can be located when the heating assembly 1100 is coupled to a nozzle and a hose.

Figure 41:
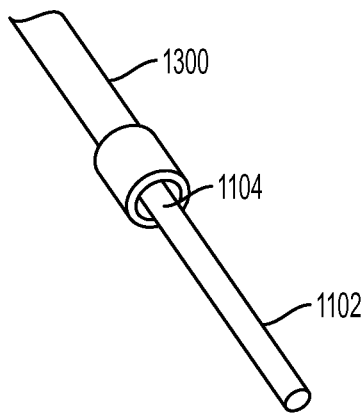
FIG. 41 is a perspective view of the heating assembly of FIG. 33 coupled to one embodiment of a hose.
Figure 42:
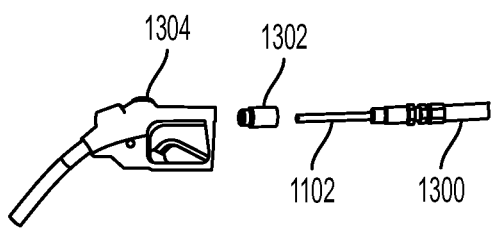
FIG. 42 is an exploded side view of the heating assembly of FIG. 33, the hose of FIG. 41, and embodiments of a nozzle and a swivel.
Figure 43:
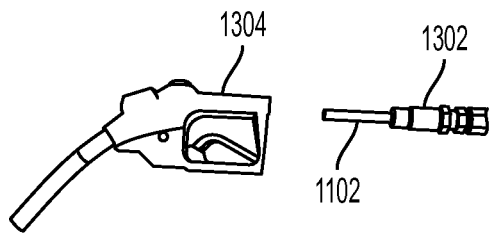
FIG. 43 is a side partially assembled view of the heating assembly, the swivel, and the hose of FIG. 42 assembled together and the nozzle of FIG. 42 unattached therefrom.
Figure 44:
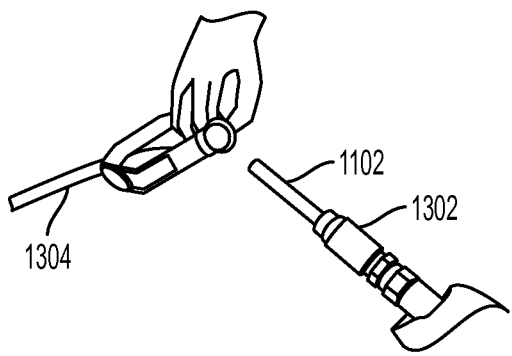
FIG. 44 is a perspective view of the partial assembly of FIG. 43.

FIG. 41 illustrates the heating assembly 1100 coupled to an embodiment of a hose 1300 configured to couple to a swivel (not shown) on a fuel dispenser. The hose 1300 and the swivel can generally be configured and used similar to other hoses and swivels described herein. Examples of the hose 1300 include the Elaflex EFL 21 hose and the Flextral PE60-100 hose. Examples of the swivel include the Franklin SS Omni DEF1X34P and the Franklin SS Omni DEF1M34.

As shown in FIG. 41, the outer tube 1104 of the heating assembly 1110 (e.g., the flexible portion of the heating assembly's longitudinal length) can be configured to be substantially contained within the hose 1300 and thus extends along an entire length of the hose. The outer extension tube 1102 (e.g., the rigid portion of the heating assembly's longitudinal length) can be configured to be located substantially outside the hose 1300. The outer extension tube 1102 can thus be configured to be substantially contained within a nozzle (not shown) coupled to the swivel. The outer extension tube 1102 thus has a proximal end that is positioned adjacent to a distal end of the outer tube 1104 and adjacent to an opening in a nozzle, and the outer extension tube 1102 extends through a substantial length of the nozzle.

Figure 45:
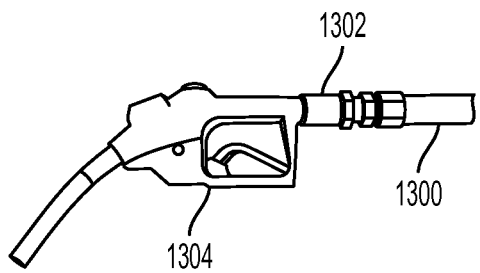
FIG. 45 is a side view of the heating assembly, the swivel, and the hose, and the nozzle of FIG. 43 assembled together.

As mentioned above, the outer extension tube's longitudinal length 1102L can vary based on a type of nozzle coupled thereto. FIGS. 42-46 illustrate the hose 1300 and the heating assembly 1100 of FIG. 41 with an embodiment of a swivel 1302 configured to attach to the hose's distal end and with an embodiment of a nozzle 1304 having a proximal end configured to attach to the swivel 1302. The swivel 1302 in this illustrated embodiment includes an Elaflex ZVA, but as mentioned herein, other swivels can be used. The nozzle 1304 in this illustrated embodiment includes an OPW 19DEF nozzle, but as mentioned herein, other types of nozzles can be attached to the heating assembly 1100 and to other embodiments of heating assemblies described herein. As shown in FIGS. 45 and 46, the heating assembly 1100 can be configured to be entirely contained within the nozzle 1304 and the hose 1300.

FIGS. 47-51 illustrate the hose 1300 and the swivel 1302 of FIGS. 42-46 with another embodiment of an outer extension tube 1400 that is part of a heating assembly (a reminder of which is obscured in FIGS. 47-51) and another embodiment of a nozzle 1306 having a proximal end configured to attach to the swivel 1302. The nozzle 1306 in the illustrated embodiment is a OPW 21GU nozzle, but as mentioned herein, other types of nozzles can be attached to this heating assembly and to other embodiments of heating assemblies described herein. The nozzle 1306 of FIGS. 47-51 has a smaller amount of space available at a proximal end thereof than the nozzle 1304 of FIGS. 42-46. Accordingly, the outer extension tube 1400 of FIGS. 47-51 has a longitudinal length that is less than the longitudinal length 1102L of the outer extension tube 1102 of FIGS. 42-46, thereby allowing the outer extension tube 1400 to be seated within the nozzle 1306.

Figure 52:
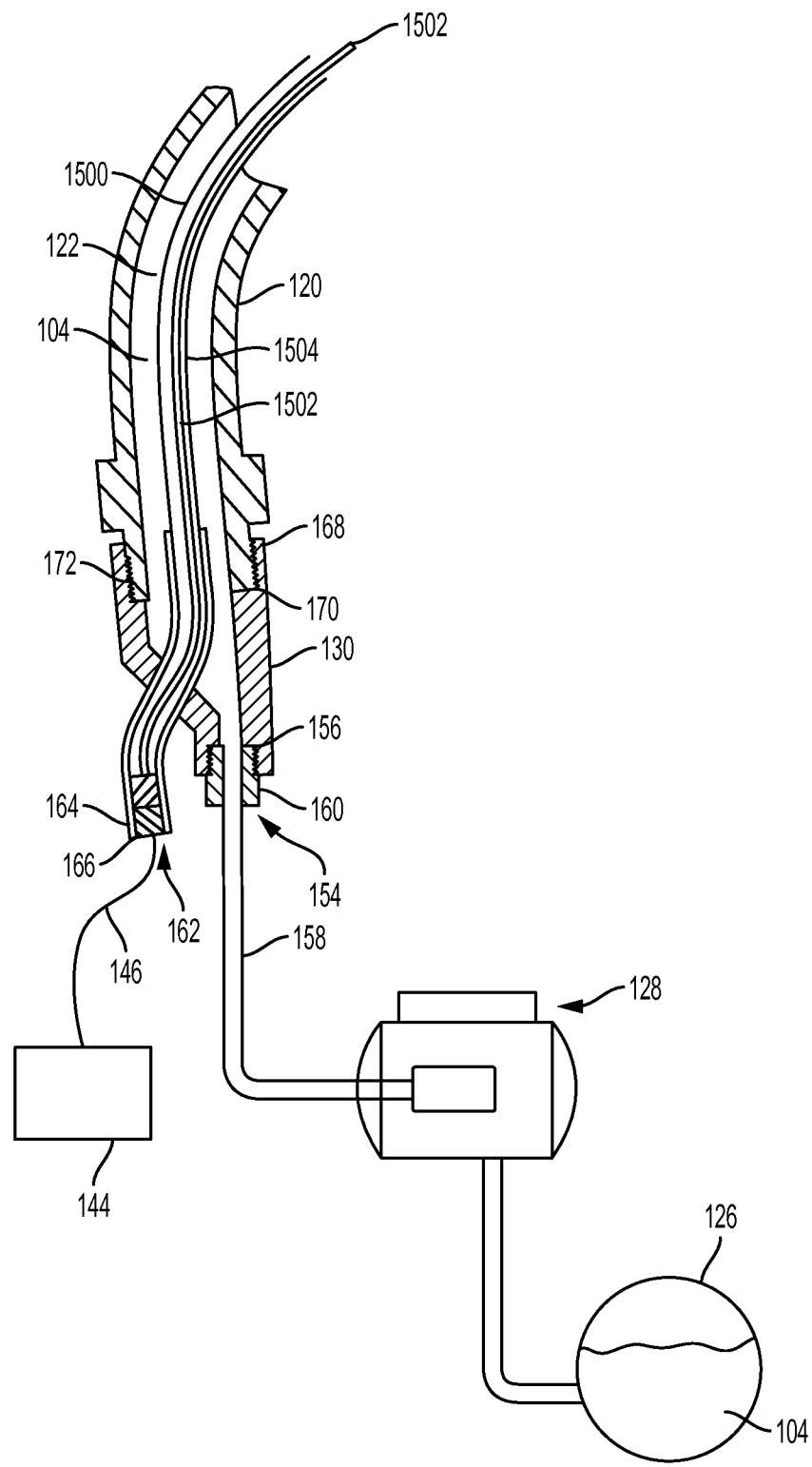
FIG. 52 is a side, partially cross-sectional view of a system including another embodiment of a heating assembly and including a portion of the system of FIG. 2.

As mentioned above, a heating element of a heating assembly can be coupled to a power supply and a control that are configured to provide power to the heating element. FIG. 52 illustrates a system including the power supply and control 144 of FIG. 2 configured to provide power to a heating element 1502 of a heating assembly that also includes an outer extension tube (not shown), an optional heat transfer element (not shown), and an outer tube 1500 having the heating element 1502 extending longitudinally through an inner passageway 1504 thereof. The system of FIG. 52 is similar to the system of FIG. 2 except that it includes the heating assembly and does not include the inner tube 124 of the hose 100, the air supply, or air flowing through the outer tube 120 of hose 100.

Figure 53:
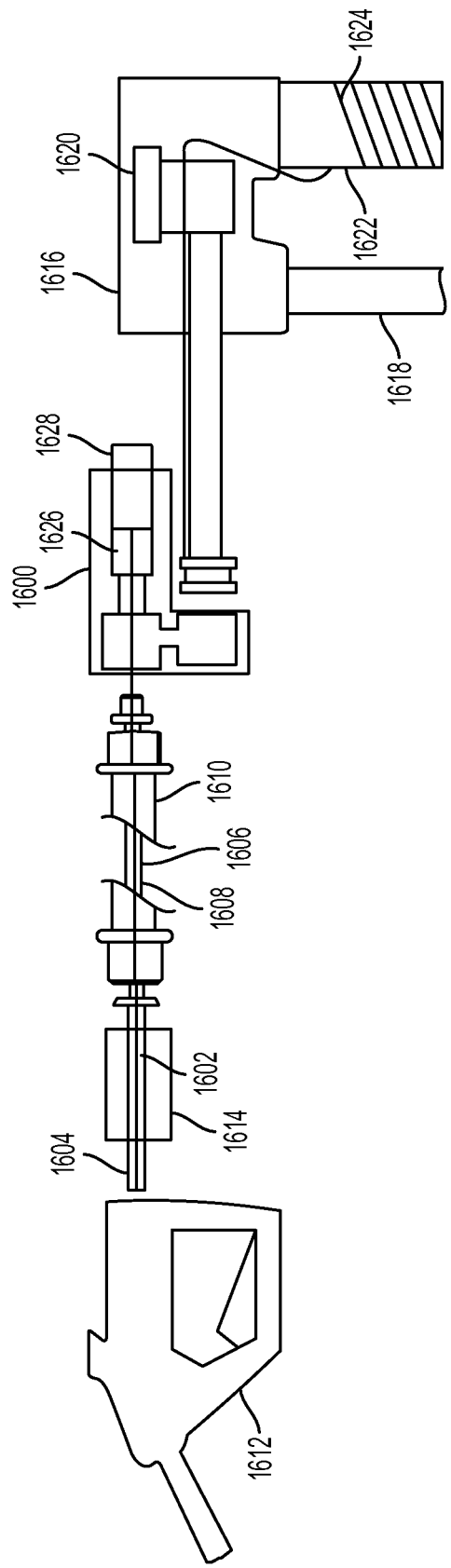
FIG. 53 is a side schematic exploded view of an embodiment of a portion of a fluid dispensing device including a nozzle, a swivel, a heating assembly, a hose, a power supply and control, and a fluid meter.

FIG. 53 illustrates another embodiment of a system including another embodiment of a power supply and control 1600 configured to provide power to a heating element 1602 of a heating assembly that also includes an outer extension tube 1604, an optional heat transfer element (not shown), and an outer tube 1606 having the heating element 1602 extending longitudinally through an inner passageway 1608 thereof. The system also includes a hose 1610, a nozzle 1612 configured to have the outer extension tube 1604 disposed substantially therein and configured to couple to a distal end of the hose 1610, a swivel 1614 configured to couple the hose 1610 and the nozzle 1612 together, and a fluid meter 1616. The fluid meter 1616 can have an inlet 1618 configured to couple to a fluid supply (not shown), a valve 1620 configured to facilitate fluid flow therethrough, and a filter 1622 having a second heating element 1624 wrapped therearound and extending through the fluid meter 1616. The second heating element 1624 can be configured to heat the fluid flowing through the fluid meter 1616 prior to the fluid entering the hose 1600. The power supply and control 1600 can include a heating module 1626 coupled to a power connector 1628 configured to connect to a power supply, e.g., a battery, a power outlet, etc.

A fluid dispensing device that includes a plurality of nozzles can include a heating assembly, according to any of the embodiments of heating assemblies described herein, for each of the nozzles so as to include a plurality of heating assemblies. In an exemplary embodiment, each of the plurality of heating assemblies can be the same as one another.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heating assembly for use with a fuel dispenser hose and nozzle, the heating assembly comprising:
    a conductive outer extension tube having a first end with a well formed therein, the well extending longitudinally at least partially along a longitudinal length of the conductive outer extension tube;
    a flexible outer tube having a longitudinal passageway extending therethrough, a first end of the flexible outer tube being coupled to the first end of the conductive outer extension tube;
    a conductive inner extension tube extending through the conductive outer extension tube, the conductive inner extension tube having a longitudinal passageway extending therethrough, and the conductive inner extension tube having a first end mated to the first end of the conductive outer extension tube;
    a heating element extending longitudinally through the longitudinal passageway of the flexible outer tube and extending at least partially through the longitudinal passageway in the conductive inner extension tube, the heating element being configured to heat fluid surrounding the conductive outer extension tube; and
    a nozzle configured to dispense fluid into a vehicle, the outer extension tube being secured within the nozzle, and an end of the heating element being disposed within the nozzle.

2. The assembly of claim 1, wherein the heating element comprises a fourth tube defining the end of the heating element that is disposed within the nozzle, and the assembly further comprises a non-conductive stopper disposed within the end of the heating element.

3. The assembly of claim 2, wherein the end of the heating element is disposed within the longitudinal passageway in the conductive inner extension tube.

4. The assembly of claim 2, wherein the end of the heating element is disposed within the longitudinal passageway in the conductive outer extension tube.

5. The assembly of claim 1, wherein the conductive outer extension tube has a second end configured to couple to the nozzle of a fuel dispenser.

6. The assembly of claim 1, wherein the flexible outer tube has a second end configured to couple to a fluid outlet on a fuel dispenser.

7. A fuel dispensing device, comprising:
    a housing having fuel dispensing components therein;
    a hose coupled to the housing and in fluid communication with the fuel dispensing components such that fluid can be passed from the fuel dispensing components through an inner lumen of the hose;
    a nozzle located entirely outside of the housing and attached to a distal end of the hose and configured to selectively dispense fluid therefrom into a vehicle, the nozzle being configured to receive fluid from the hose and to dispense fluid therefrom and into the vehicle;
    a tube extending longitudinally within the hose and having an inner lumen extending therethrough, the inner lumen of the tube being isolated from the inner lumen of the hose; and
    a heating element extending longitudinally within the inner lumen of the tube, the heating element being configured to heat fluid passing through the hose.

8. The device of claim 7, further comprising a conductive tube attached to a distal end of the tube, the heating element extending longitudinally through at least a portion of an inner lumen of the conductive tube.

9. The device of claim 8, further comprising a heat transfer element disposed within the inner lumen of the conductive tube in surrounding relation to the heating element.

10. The device of claim 8, wherein the conductive tube is disposed at least partially within the nozzle, and a terminal distal end of the heating element is located within the conductive tube within the nozzle.

11. The device of claim 7, wherein a terminal distal end of the heating element is located within the nozzle, and the heating element is fully contained within the hose and the nozzle.

12. The device of claim 7, wherein the heating element comprises a heat cable.

13. The device of claim 7, wherein the heating element comprises a positive temperature coefficient (PTC) heater.

14. The device of claim 7, further comprising a nozzle boot coupled to the housing, the nozzle boot being configured to removably and replaceably seat the nozzle therein.

15. The device of claim 7, wherein the fuel dispensing components in the housing include a fluid line configured to receive from an underground fluid supply the fluid that is passed from the fuel dispensing components.

16. The device of claim 7, wherein the nozzle is configured to be inserted into the vehicle and dispense the fluid therefrom into the vehicle.

* * * * *